United States Patent [19]

Thomas, Jr.

[11] Patent Number: 4,821,294
[45] Date of Patent: Apr. 11, 1989

[54] DIGITAL SIGNAL PROCESSOR AND PROCESSING METHOD FOR GPS RECEIVERS

[75] Inventor: Jess B. Thomas, Jr., La Canada, Calif.

[73] Assignee: California Institute of Technology, Pasadena, Calif.

[21] Appl. No.: 71,121

[22] Filed: Jul. 8, 1987

[51] Int. Cl.$^4$ ................................................. H04B 7/01
[52] U.S. Cl. ...................................... 375/96; 342/352; 375/1; 375/97
[58] Field of Search ........................ 375/1, 96, 97, 115; 342/352, 357, 358; 364/459, 728; 370/104; 455/12, 13

[56] References Cited

U.S. PATENT DOCUMENTS

| | | |
|---|---|---|
| 4,112,372 | 9/1978 | Holmes et al. ............................ 375/1 |
| 4,361,891 | 11/1980 | Lobenstein et al. ..................... 375/1 |
| 4,494,238 | 1/1985 | Groth, Jr. ................................. 375/1 |
| 4,530,103 | 7/1985 | Mosley, Jr. et al. ..................... 375/1 |
| 4,633,426 | 12/1986 | Venier ..................................... 375/96 |
| 4,701,934 | 10/1987 | Jasper ...................................... 375/1 |

*Primary Examiner*—Benedict V. Safourek
*Attorney, Agent, or Firm*—Leonard Tachner

[57] ABSTRACT

A digital signal processor and processing method therefor for use in receivers of the NAVSTAR/GLOBAL POSITIONING SYSTEM (GPS) employs a digital carrier down-converter, digital code correlator and digital tracking processor. The digital carrier down-converter and code correlator consists of an all-digital, minimum bit implementation that utilizes digital chip and phase advancers, providing exceptional control and accuracy in feedback phase and in feedback delay. Roundoff and commensurability errors can be reduced to extremely small values (e.g., less than 100 nanochips and 100 nanocycles roundoff errors and 0.1 millichip and 1 millicycle commensurability errors). The digital tracking processor bases the fast feedback for phase and for group delay in the C/A, $P_1$, and $P_2$ channels on the $L_1$ C/A carrier phase thereby maintaining lock at lower signal-to-noise ratios, reducing errors in feedback delays, reducing the frequency of cycle slips and in some cases obviating the need for quadrature processing in the P channels. Simple and reliable methods are employed for data bit synchronization, data bit removal and cycle counting. Improved precision in averaged output delay values is provided by carrier-aided data-compression techniques. The signal processor employs purely digital operations in the sense that exactly the same carrier phase and group delay measurements are obtained, to the last decimal place, every time the same sampled data (i.e., exactly the same bits) are processed.

26 Claims, 12 Drawing Sheets

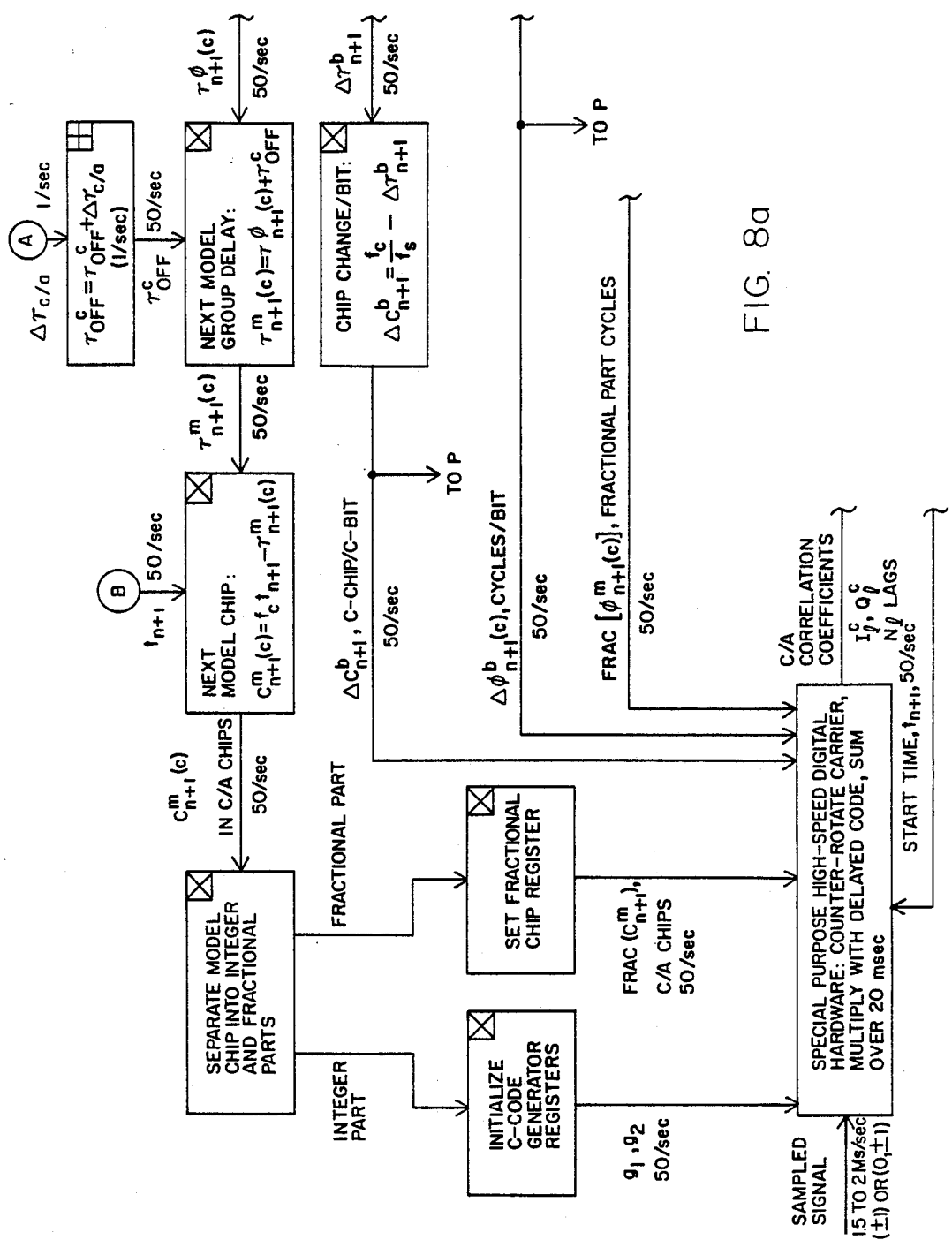

DIGITAL SIGNAL PROCESSOR AND PROCESSING METHOD FOR GPS RECEIVERS

BACKGROUND OF THE INVENTION

1. Description

The invention described herein was made in the performance of work under a NASA contract, and is subject to the provisions of Public Law 96-517 (35 USC 202) in which the Contractor has elected to retain title.

2. Field of the Invention

The present invention relates generally to receivers for the Global Positioning System and more specifically, to an all-digital GPS signal processor having a unique digital tracking processor as well as to a digital processing method carried out therein.

PRIOR ART

The NAVSTAR/GLOBAL POSITIONING SYSTEM (GPS) will provide extremely accurate three-dimensional position and velocity information to users anywhere in the world. The position determinations are based on the measurement of the transit time of RF signals from a number of satellites selected from a total constellation of 18. The signals are modulated with two codes: P, which provides for precision measurement of transit time; and C/A which provides for crude measurement of same and for easy lock-on to the desired signal. The satellites employ a shaped-beam antenna that radiates to a 0-dBic ground antenna near-uniform power of at least $-163$ dBW for the $L_1$ P code and $-160$ dBW for the $L_1$ C/A code. The corresponding $L_2$ power level carrying only the P code is at least $-166$ dBW.

At least four satellites are required for navigation purposes. The visible satellites offering the best geometry can be selected either manually or automatically by receivers using ephemeris information transmitted by the satellites. Ranges to the observed satellites are determined by scaling the signal transit time by the speed of light. The transmitted message contains ephemeris parameters that enable the user to calculate the position of each satellite at the time of transmission of the signal.

The measurement of range to the satellites made by the user with an imprecise clock, is sometimes called "Pseudo-range" because it contains a bias of fixed magnitude in each range estimate due to the clock error. In this description, pseudorange will also be referred to as group delay.

The GPS user measures the apparent (pseudo-range) transit time by measuring the delay or time shift between the pseudorange noise (PRN) code generated in the space vehicle and the identical code sequence generated by the user receiver, with each synchronized with its own clock. The receiver code is shifted until maximum correlation is achieved between the two codes; the time magnitude of the shaft is the receiver's measure of delay (pseudo-range).

The navigation signal transmitted from the space vehicles consists of two RF frequencies, $L_1$ at 1575.42 MHz and $L_2$ at 1227.6 MHz. The $L_1$ signal is modulated with both the P and the C/A pseudo-random noise codes in phase quadrature. The $L_2$ signal is modulated with the P code. Both the $L_1$ and $L_2$ signals are also continuously modulated with the navigation data-bit stream at 50 bps. The functions of the codes are twofold: (a) identification of space vehicles, as the code patterns are unique to each space vehicle and are matched with like codes generated in the user receiver; and (2) the measurement of the navigation signal transit time by measuring the phase shift required to match the codes. The P code is a long precision code operating at 10.23 Mbps and is difficult to acquire. The C/A (clear access) code is a short code, readily acquired, but operating at 1.023 Mbps, which provides a more coarse measurement of delay. The C/A code is a normally acquired first and a transfer is made to the P code. It is possible, however, for users with precision clocks precisely synchronized with GPS time and the approximate knowledge of their position (10,000 ft–20,000 ft) to bypass the C/A code and acquire the P code directly.

The P code generated in each space vehicle is a pseudo-random noise chip sequence of seven days in length.

In order for the ground receiver to lock onto the P code, it must know approximately what time-slice in the seven-day code to search. At typical receiver search rates, on the order of 50 bits per second, the time required to search as much as one second of the seven-day P code would require many hours. It is therefore necessary to resort to the C/A code for initial code match and lock-on when good a priori information on receiver position, clock offsets and satellite position is not available.

The C/A code is a pseudo-random noise chip stream unique in pattern to each space vehicle that repeats every millisecond. It is relatively easy for a receiver to match and lock onto the C/A code because the search is limited to the time interval of one millisecond and the chip rate is only one-tenth that of the P code. The P code frequency affords the degree of accuracy required for the measurement of signal transit time that the C/A code frequency could not.

The navigation message contains the data that the user's receiver requires to perform the operations and computations for successful navigation with the GPS. The data include information on the status of the space vehicle; the time synchronization information for the transfer from the C/A to the P code; and the parameters for computing the clock correction, the ephemeris of the space vehicle and the corrections for delays in the propagation of the signal through the atmosphere. In addition, it contains almanac information that defines the approximate ephemerides and status of all the other space vehicles, which is required for use in signal acquisitions. The data format also includes provisions for special messages.

SUMMARY OF THE INVENTION

There components have been combined in the present invention to produce an all-digital GPS signal processor with outstanding accuracy, high dynamic tracking, versatile integration times, lower loss-of-lock signal strengths and infrequent cycle slips. The three components are: Digital chip advancer; carrier down-converter and code correlator; and digital tracking processor.

A highly accurate, all digital correlator and down converter for GPS receivers permits roundoff and commensurability errors to be reduced to extremely small values. The use of digital chip and phase advancers provides outstanding control and accuracy in phase and feedback. Flexibility is provided by the feature of arbitrary start time and integration length. A minimum bit design requires a minimum number of logical elements, thereby reducing size, power and cost.

The invention combines the features of all-digital implementation with C/A phase-driven fast feedback loops for all phases and delays, thereby providing high accuracy, high dynamics, loss of lock at lower signal strengths and infrequent carrier cycle slips. Simple techniques for cycle counting, data-bit extraction and data-bit synchronization eliminate the need for involved circuitry and/or software found in existing receivers. Flexibility is provided in selecting feedback interval and output averaging interval.

A pseudorandom code sequence is generated by simple digital logic that incorporates the effects of time, delay and delay rate. For each integration interval, both chip and chip rate are initialized to a small fraction of a chip, for example, to the order of $10^{-7}$, thereby making feedback control and delay extraction highly accurate and flexible. Appropriate selection of sample rate relative to chip rate, reduces commensurability errors to extremely small levels.

The digital code generator is initialized each correlation interval on the basis of the initial integer chip supplied on the basis of feedback by other hardware or software. The fractional chip register is initialized with the associated fractional chip supplied by the feedback. The fractional chip register is then digitally incremented for every subsequent sample point by the chip change due to both time and delay rate. Whenever the fractional chip register overflows as the result of an increment, another chip has been reached and a pulse is sent to the code generator which responds with the next code sign.

OBJECTS OF THE INVENTION

It is an object of the present invention to provide a compact, highly accurate, yet simple and versatile carrier down-converter and code correlator for a GPS receiver, with highly flexible control of phase and delay.

It is another object of the present invention to provide a reliable, compact, highly accurate, high dynamic GPS tracking processor with the simplest possible circuitry and logic, with loss of lock at lowest possible signal strengths and with extremely infrequent cycle slips.

It is still another object of the present invention to accurately and simply generate a delayed pseudorandom code sequence with a high degree of control in a purely digital fashion primarily for use in GPS signal processing.

It is still another object of the present invention to provide a high-accuracy, high dynamic GPS baseband processor with variable integration times, low loss-of-lock signal strengths and extremely infrequent carrier cycle slips.

It is still another object of the present invention to provide a GPS digital signal processor in which all fast feedback loops for phase and delay are driven by C/A $L_1$ phase, with an additional slow feedback correction for P-$L_1$ phase, for P-$L_2$ phase and for all delays.

It is still another object of the present invention to provide a method of processing GPS signals in a purely digital manner.

BRIEF DESCRIPTION OF THE DRAWINGS

The aforementioned objects and advantages of the present invention as well as additional objects and advantages thereof will be more fully understood hereinafter as a result of a detailed description of a preferred embodiment when taken in conjunction with the following drawings in which:

FIGS. 8s and 8b, are flow charts of the feedback loop for the C/A channel in the tracking processor of the invention;

DETAILED DESCRIPTION OF A PREFERRED EMBODIMENT

Figure 1:
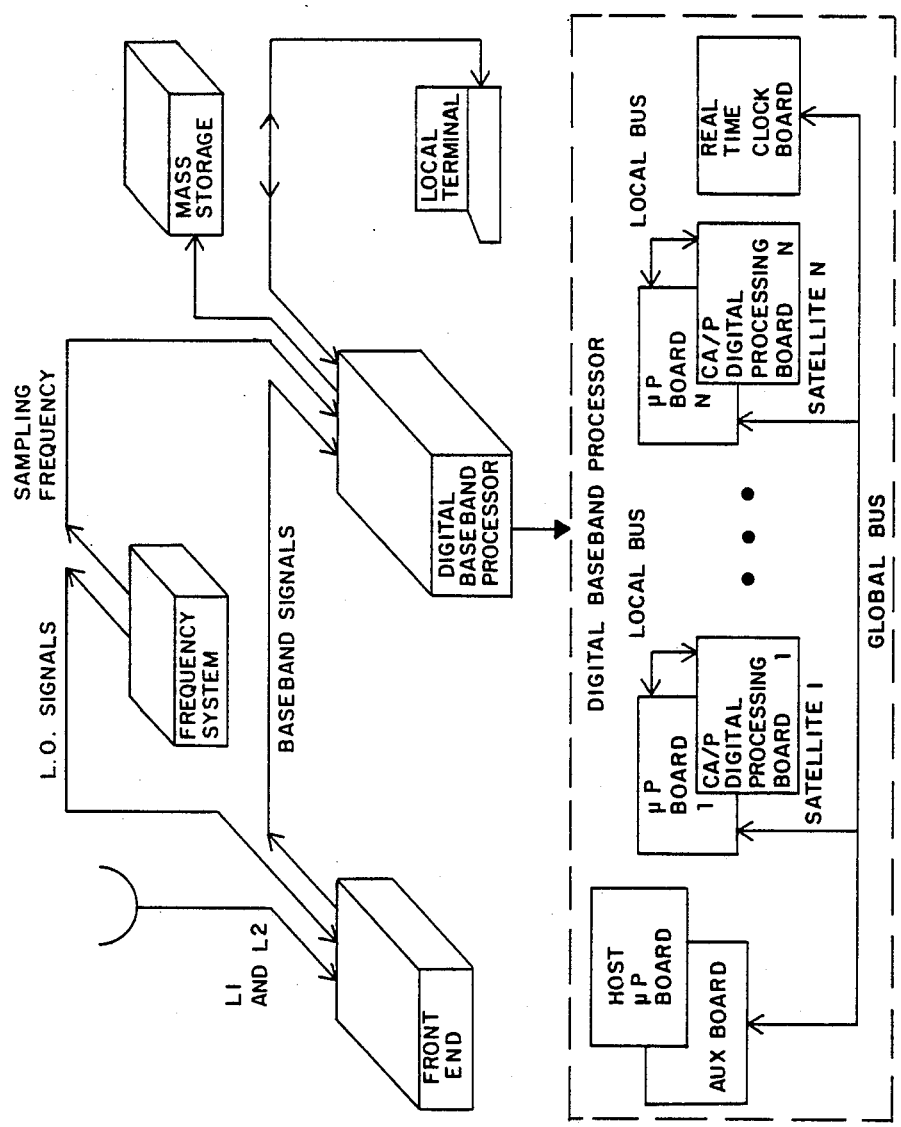
FIG. 1 is a simplified block diagram of a GPS receiver employing the digital processor of the present invention.

To illustrate the use of the digital signal processor in the context of a complete receiver, reference is first made to FIG. 1 which represents a top level block diagram of a GPS receiver of the present invention. It is assumed that antenna, front end, and frequency subsystems are all designed and implemented in a manner that provides the necessary baseband signals to the baseband processor. Using fixed-frequency L.O.'s, the frontend hardware down-converts the GPS signals from RF to baseband, where the signals are low pass filtered and digitally sampled. Three digitally sampled signals are supplied: The $P_1$ and $P_2$ signals (e.g. each at 15.374 Ms/sec) and the C/A signal (e.g. at 1.5374 Ms/sec). The three signal processing paths followed by these three signals will be referred to as channels herein. Two important aspects of the frequency subsystem are sampling frequency and L.O. offset frequencies. The sampling frequency must be highly incommensurate with the fundamental chip rate (e.g. 15.374 MHz vs. 10.23 MHz) so that discrete sampling errors will be negligible. For earth-fixed receivers, the frequency offset of the L.O.'s should be of the order of 10 kHz so that carrier down-conversion in the baseband processor will work with good accuracy.

Figure 2:
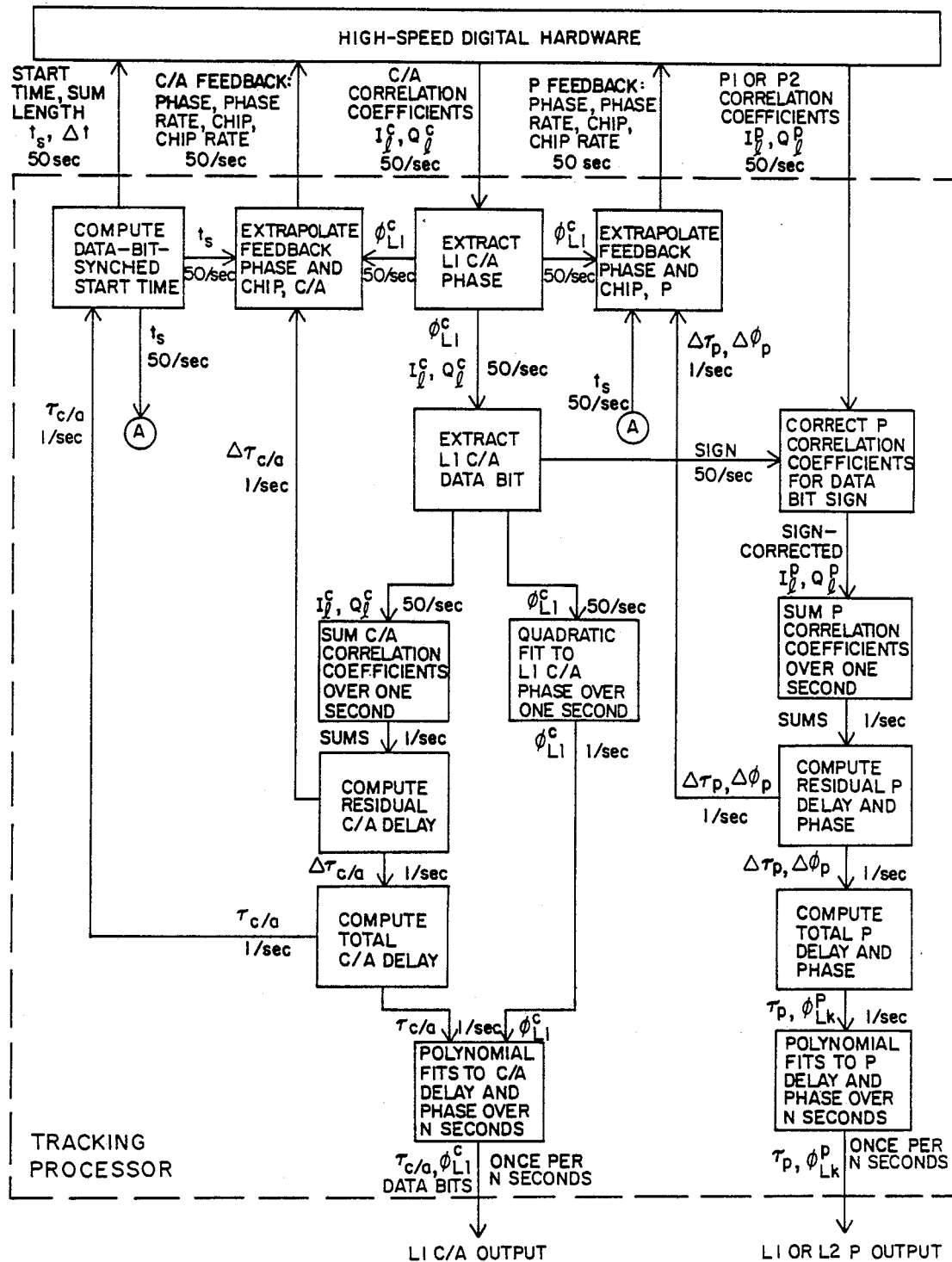
FIG. 2 is a functional block diagram of the signal processing in the tracking processor of the present invention.
Figure 3:
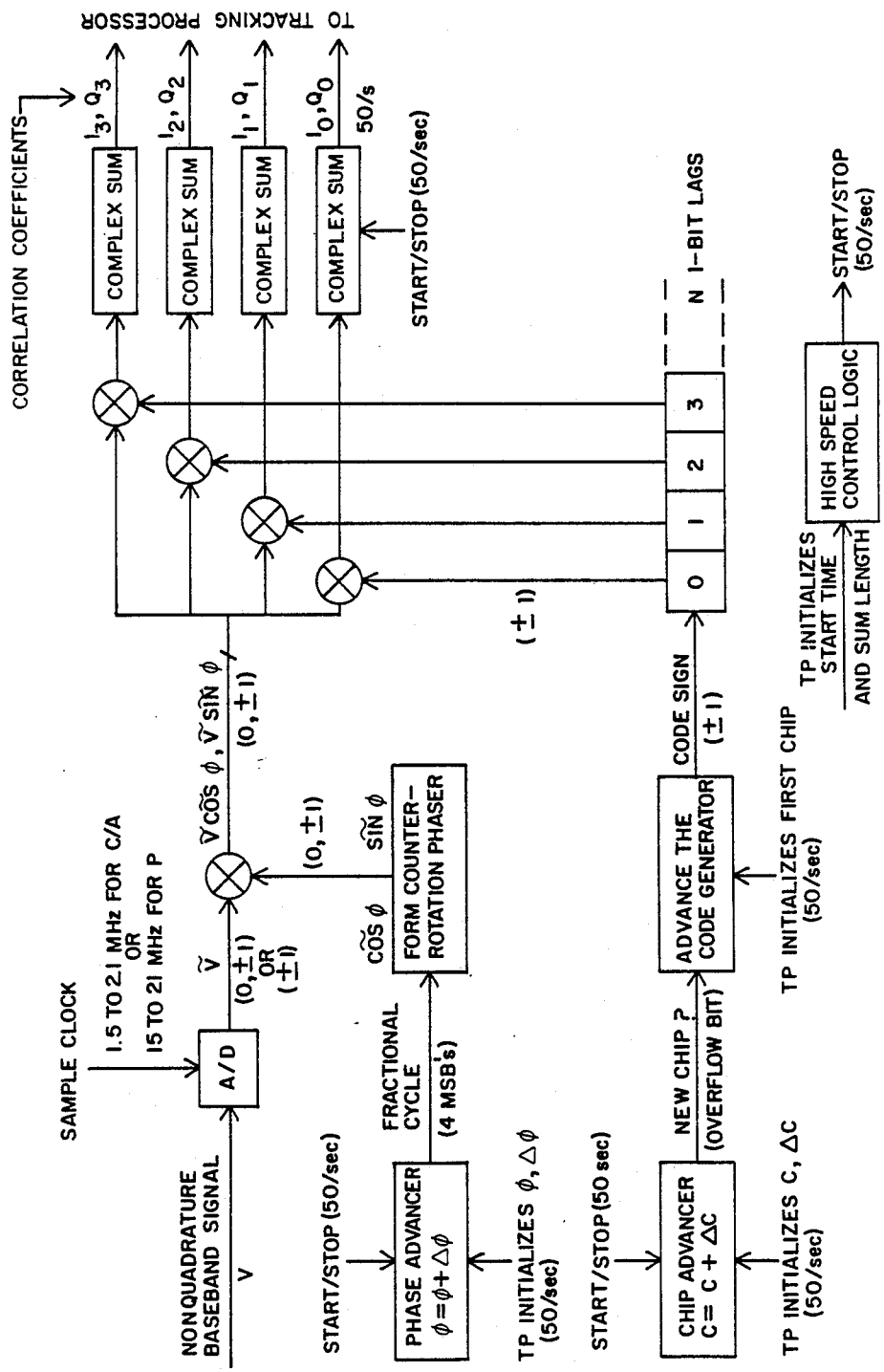
FIG. 3 is a functional block diagram of the signal processing in the high speed digital processor of the present invention.

The signals of all visible GPS satellites are simultaneously received by an "omni-directional" antenna and are therefore all embedded in the baseband signal. In the digital baseband processor, a separate digital signal processor is provided to extract the signals for each satellite. In FIG. 1, the microprocessor "board" and the digital processing "board" comprise the digital signal processor. A host microprocessor coordinates the digital signal processors and collects the output data. The digital signal processor consists of two major components: The tracking processor and the high-speed digital processor. FIGS. 2 and 3 show functional block diagrams of these two components and indicate their combination.

Even though this illustration shows each digital signal processor reducing the signal from only one satellite, more than one satellite could be processed by a digital signal processor by programming its microprocessor to time-multiplex its digital hardware between satellites.

Besides the usual advantages of reliability and compactness characterizing digital design, numerous advantages are provided by the present design of the baseband processor. By way of example, the following is a listing of such advantages:

(a) The total errors caused by the baseband processor are very small for delay and phase (less than 0.1 millichip and 1 millicycle, respectively);

(b) High dynamics (up to 100 g's) can be tracked with high accuracy;

(c) Signal strengths at which loss of lock occurs are 3 to 6 db lower than other receivers, given nominal GPS phase I specs for C/A and $P_2$ power level;

(d) The rate of occurrence for cycle slips is extremely low for all channels;

(e) The design requires no special circuitry to do data-bit synch, data-bit extraction and cycle counting;

(f) Selectable fast feedback interval (2, 4, 5, 10, 20 msec) provides valuable flexibility in making tradeoffs between dynamics and SNR;

(g) Selectable output-point spacing (1, 2, 3, ... 300 sec) satisfies the requirements of a wide range of users. (If necessary, spacings between 20 and 1000 msec could also be included in the design). Subsequent data reduction is simplified for the user by forcing output timetags to fall on integer seconds that are synchronized to GPS time;

(h) Sample rate and carrier frequency offsets can be set within a wide range of values;

(i) Start time and length of each correlation interval can be set by the microprocessor, providing great flexibility in operation, including multiplexing between satellites;

(j) System noise errors in C/A and P delays are reduced by a factor of about 1.5 by an improved data compression scheme;

(k) Tracking errors in phase and delay are reduced in high dynamic applications by better use of feedback error.

ALL DIGITAL CARRIER DOWN-CONVERTER AND CODE CORRELATOR

Figure 4:
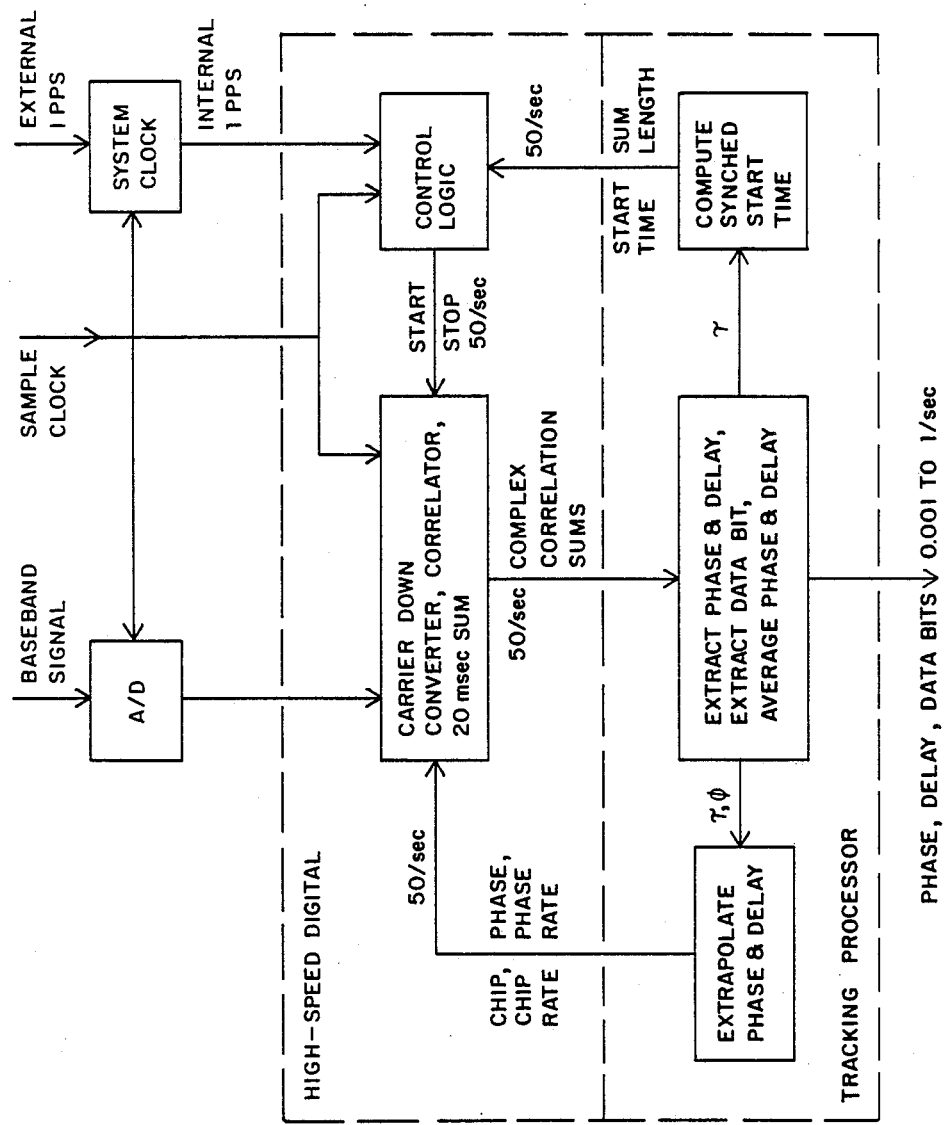
FIG. 4 is a simplified representation of the digital baseband processor of the invention.

As illustrated in FIG. 4, the digital baseband processor consists of two major components: A high-speed digital processor (i.e., the correlator and down converter) and a tracking processor. Control information sent by the tracking processor consists of the start time, sum interval length, initial phase and phase rate and initial delay and delay rate. Based on this input, the high-speed digital hardware accepts input data sampled at 1.5–2 MHz for the C/A channel and 15–20 MHz for the P channel and counter-rotates the carrier, cross-correlates with the pseudorandom code, and accumulates the result over a nominal 20 millisecond interval. All high-speed components are clocked by the P or C/A sample clock. The resulting correlation sums, sometimes referred to as correlation coefficients, are collected by the tracking processor and reduced to extract measured phase, delay and data-bits. The tracking processor analyzes these phase and delay values and averages them to obtain feedback values to drive the digital hardware and averages them over longer time intervals in order to reduce the output data rate.

A functional block diagram of the high-speed digital processor is shown in FIG. 3. As indicated, the major steps in high-speed processing of the digitized baseband signal are carrier down-conversion, code cross-correlation and correlation accumulation. This process produces a complex correlation coefficient for each of N lags. FIG. 3 is valid for both the C/A channel and the P channels and is shown for non-quadrature sampling. In principle, quadrature processing could be accomplished by replicating for the quadrature channel the counter-rotation mixer, the code mixer and the accumulators, while sharing the phase and code generators. At the input, the band-limited baseband signal is digitized to two levels (+, −) or three levels (+, 0, −), with a Nyquist sample rate of 1.5 to 2.1 MHz for C/A or 15 to 21 MHz for P, depending on the specific hardware implementation. The system described herein has a sample rate of 15.374 MHz for P and 1.5374 MHz for C/A and two-level sampling for all channels.

After sampling, the signal is counter-rotated (down-converted) by means of a complex multiply with a three-level (+, 0, −) phaser generated in the high-speed hardware on the basis of feedback. Although start time and sum interval can be arbitrarily set, the sum interval will be specified as "20 msec" with the understanding that this value refers to a nominal GPS sum interval of about 19 msec that has been synchronized with data-bit edges by the tracking processor. The tracking processor can easily synchronize a sum interval with data-bit edges by setting the start time of the interval to an integer times 20 msec plus the most recent measured C/A group delay. The approach totally eliminates the data-bit-synch circuitry found in most receivers. Over the sum interval, counter-rotation phase is approximated by a linear function whose initial value and rate are set every sum interval by the feedback loop. The initial value is supplied in the form of an integer equal to the starting fractional phase multiplied by $2^{24}$. The phase rate is supplied in the form of an integer equal to phase rate in cycles/bit multiplied by $2^{24}$. For each new sample point, the phase advancer increments phase by adding the phase rate register. As phase is updated, integer cycles that appear as overflow are discarded because integer cycles have no effect on computation of sinusoids.

Figure 6:
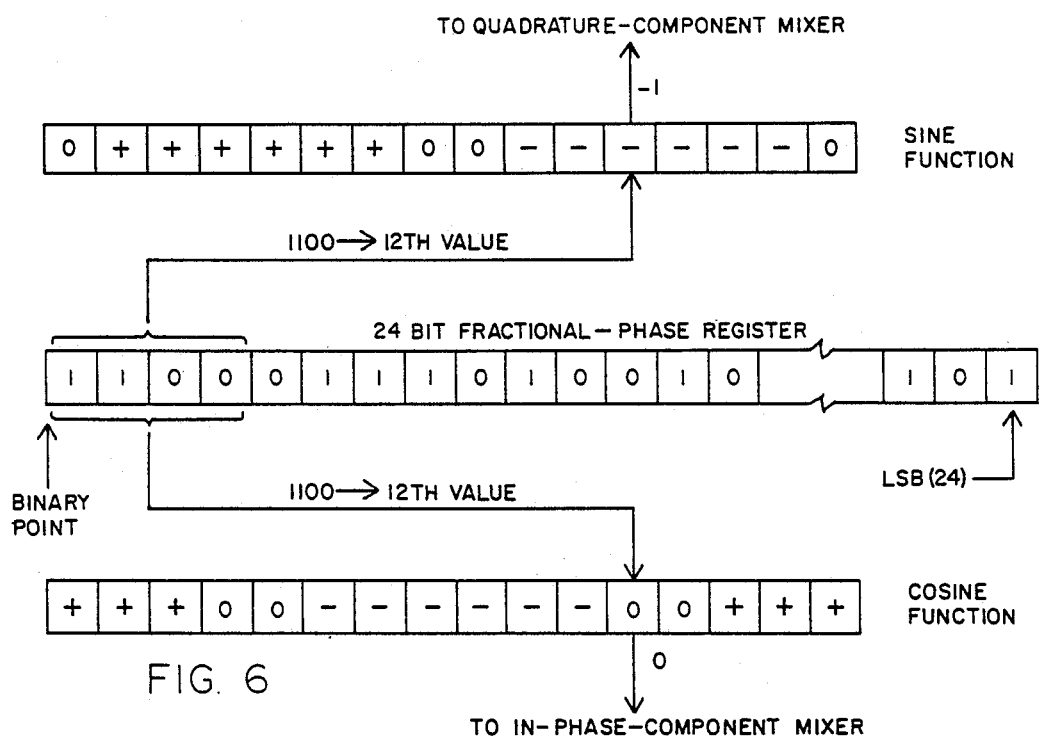
FIG. 6 is a schematic illustration of digital operations that produce three-level down-conversion phasers.
Figure 5:
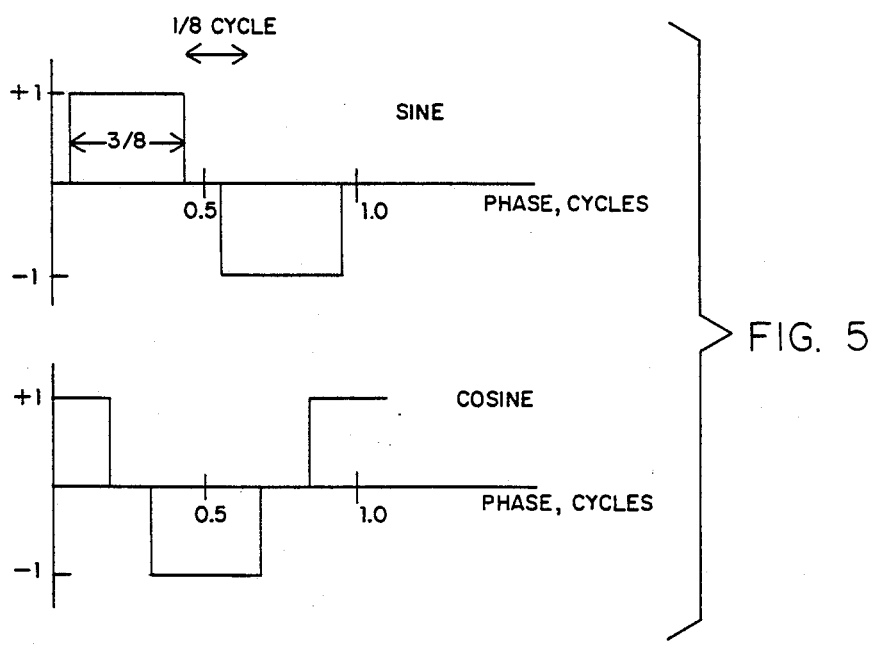
FIG. 5 is a graphical representation of the quadrature three-level sinsoids used in the down-converter phase logic of the invention.

To generate the counter-rotation phaser, the four most significant bits of the phase register are extracted to drive digital logic designed to produce the quadrature three-level sinusoids shown in FIG. 5. A schematic illustration of that digital logic is shown in FIG. 6. Multiplication of the sampled input signal with this quantized phaser results in a three-level product (+, 0, −). After counter-rotation, the signal is power divided into N paths and each path is multiplied by a lagged code value.

In order to generate the code values, the high-speed hardware is supplied register values to set the initial (integer) chip, the initial fractional chip, and the chip rate. As implied, the chip model, like the phase model, is approximated by a linear function of time over the sum interval. The chip model depends on both the model delay (extrapolated by the tracking processor) and change of chip with the passage of time (i.e., chip/- bit=10.23 MHz/p-sample rate). In the illustrated embodiment, the fractional chip register and the chip rate register for the C/A channel are passed as integers equal to the fractional chip and chip rate (in chip/bit) times $2^{24}$, respectively. For the P channel, the multiplier is $2^{28}$. To initialize the first (integer) chip, two register values must be derived and supplied to the C/A code generator and six for the P code generator.

For each new sample, the chip advancer increments the fractional chip register. When a given increment results in a transition to a new chip, the chip register overflows and sends a pulse to advance the code generator to a new chip. The output of the code generator is a two-level signal (+or −), representing the code sign. If a pulse requesting a new chip is not received for a given sample, the lase code sign will persist for that sample. The output of the code generator is passed into a tapped N-bit delay line whose multiple outputs are multiplied branch-by-branch by the complex output of carrier counter-rotator. The complex three-level output of each of these products is then accumulated over a "19 millisecond" interval. (A 1 or 2 msec deadtime is left in order to avoid data-bit edges and to allow deadtime operations). At the end of the sum interval, the contents of the accumulators are passed to the tracking processor and then set to zero for the next "20 millisecond" interval.

As indicated in the lower right-hand corner of FIG. 3, the high-speed hardware is started and stopped by high-speed control logic that is supplied with a sum length in the form of P-sample bits and with a start time in the form of an integer-second part (in seconds) and a fractional-second part (in p-sample bits). When the system time, which is driven by the p-sample clock (e.g., 15.374 MHz), equals the start time registers, the start line is raised to activate the high-speed digital hardware. Deactivation occurs when the register containing the sum length counts to zero.

Because all operations, including carrier down-conversion, are digital, phase and delay can be tracked and measured with extremely small errors. Given 24-bit chip and phase advancers, for example, roundoff errors are less than 100 nanochips and 100 nanocycles. Commensurability errors, on the other hand, depend on the specific value of sample rate relative to baseband carrier frequency and to chip rate (with both offset by doppler effects). By properly selecting sample rate, commensurability errors can be reduced to very low levels. For example, given and ground-based GPS receiver and a P-sample rate of 15.374 MHz, the worst-case commensurability errors are 0.13 millichip and 1 millicycle. In practice, actual errors are far less than these small values since changing doppler will smear over the quantization spacing in less than a second. For comparison, the worst-case error for the highly commensurate sample rate of 20.46 MHz is 0.5 chip in delay, which will smear out in about 15 seconds due to doppler for a ground-based receiver. Finally, the "sum-note" error in carrier down-conversion will average down to a millicycle or less over a 20 millisecond integration if the carrier frequency is more than 4 kHz at baseband. Such an offset is accomplished by setting the total mixing frequency in the down-conversion from RF to a value at least 4 kHz less than the minimum doppler-shifted carrier frequency.

Great flexibility in control is provided by the fact that this design is driven by supplied values for start time, integration length, phase, phase rate, delay and delay rate. For example, maximum allowed acceleration can be increased by as much as a factor of 16 by decreasing the integration time from 20 milliseconds to 5 milliseconds. The flexibility in start time and integration length allows the controlling hardware or software to easily synchronize the sum interval with data-bit transitions. Multiplexing systems that switch the correlator between satellites are readily accommodated by this design since all parameters can be reset for each integration interval for each satellite. Fundamental chip rates other than the 10.23 MHz setting for GPS can be easily accommodated by properly setting the chip rate register. A similar statement can be made for baseband carrier frequency, which can possess a range of frequencies.

Another flexible feature of this design is the sample rate. The design itself does not restrict the rate range of the sample clock. Limits on sample rate will be set by the speed range of the specific hardware implementation.

Even though the basic design would apply to any number of levels per sample, the minimum bit design has been illustrated in FIG. 3. In this design, there is a voltage signal-to-noise ratio (SNR) loss of 4% due to three-level quantization of the down-conversion sinusoids and a 20% loss due to two-level sampling of the baseband signal. For the other option, three-level sampling of the baseband signal, there is approximately a 10% loss. If these small losses in SNR are acceptable in a given application, one can implement the minimum-bit design and arrive at a digital logic with a minimum number of logical elements, thereby greatly reducing size, power consumption, and cost of the integrated circuit chip(s) fabricated to carry out these operations. The capability of processing two-level samples is very valuable for another reason in applications that can spare the loss in SNR. Both the sampling circuitry and the front-end hardware become much simpler, because sampling circuitry becomes a chipper and sign test and the front-end hardware requires little or no automatic gain control.

The design can also be used for quadrature processing even though FIG. 3 illustrates a single nonquadrature channel. To process complex signals, the operations in FIG. 3 are applied separately to each quadrature channel in parallel hardware channels. Both quadrature channels can be serviced by the same circuitry for generating delay code and counter-rotation phasers. At the end of an integration interval, subsequent processing combines the complex sums with appropriate signs for the real and imaginary parts.

DIGITAL GPS TRACKING PROCESSOR

A. Top Level Funcational Description

A top level block diagram of the tracking processor is shown in FIG. 2, including the interface with the high-speed hardware. The figure shows the C/A channel and one P channel with the understanding that the P channel would represent either $P_1$ or $P_2$.

The following discussion will refer to the fast feedback interval as the "20 msec" interval even through, in principle, the interval could be 1, 2, 4, 5, 10 or 20 milliseconds. For a setting less than 20 milliseconds, logic is included that takes into account the fact that the same data-bit is measured more than once and reduces the multiple measurements into one per 20 milliseconds.

The input to the C/A processing, the C/A correlation coefficients, are analyzed every 20 milliseconds to extract $L_1$ carrier phase. This phase is used to extrapolate ahead in time to produce fast (20 msec) feedback values for all delays and for the P-$L_1$ and P-$L_2$ phases. To obtain the data-bit for each 20 msec interval, only the correlation output for the prompt delay of the C/A channel is tested. Delay feedback based on C/A phase is so accurate over short time intervals that the C/A correlation coefficients can be summed for each lag over one second. Lag dependence of these sums is used to extract residual delay which is then used in two ways. First, it is used as a slow (one second) feedback correction to the fast (50 seconds) phase-extrapolated delay feedback. This correction accounts for slow drifts of group delay relative to phase delay, drifts mainly due to ionosphere effects. Second, residual delay is combined with averaged model (feedback) delay to produce a total measured delay each second. Once per second, this total delay is used to readjust the data-bit synchronization of the "20 msec" start time that activates the digital hardware. The 20 msec phase values for the C/A channel are fit with a quadratic time function over each one-second interval to produce one "average" phase value per second. Both the one-second phase values and the one-second delay values are then subjected to a polynomial fit over an N second interval to produce one phase and one delay value every N seconds. These fit values, along with 50*N data-bits, are the primary output of the C/A channel.

In parallel with the C/A processing, the two P channels are also reduced, as symbolized by the one P channel in FIG. 2. As indicated above, the fast feedback for both delay and phase for the P channels is based on C/A $L_1$ phase. Once each 20 milliseconds, phase and delay extrapolated in this manner are used to calculate quantities needed to initialize the digital hardware: Initial chip (integer and fractional parts), chip rate, phase (fractional part), and phase rate. The P-channel correlation coefficients produced by the digital hardware and summed over one second. A sign correction based on the data-bit sign from the C/A channel is applied to the P output as needed. The application of this sign correction expands the ambiguity range of $P_1$ and $P_2$ phase from 180 to 360 degrees, provided the C/A channel does not slip half cycles. After a one second sum is completed, an algorithm based on early/prompt/late amplitudes extracts residual delay while an arc tangent operation based on the in-phase and quadrature components for the prompt lag extracts residual phase. These residual delay and residual phase values are both fed back once per second to correct the fast feedback values predicted by C/A $L_1$ phase. This slow feedback correction accounts for slow drifts of P delay and P phase relative to the values based on C/A $L_1$ phase. Residual delay and residual phase are combined with averaged model delay and averaged model phase, respectively, to obtain total measured P delay and P phase. As in the C/A channel, the one-second values are fit with a polynomial time function to produce one phase and one delay value every N seconds.

In real-time systems, the time at execution becomes an important consideration. In the feedback process, some operations must be performed during the deadtime between 20 msec intervals if information from the most recent interval (n) is to be incorporated in the feedback for the next interval (n+1). Since the deadtime interval should be made as small as possible in order to minimize lost data, the number of deadtime operations should be minimized. In order of sensitivity to feedback promptness, the feedback quantities are phase, phase rate, delay, delay rate. Of these four, only feedback phase has to be based on the last feedback interval. The other three can be set up on the basis of earlier intervals (e.g. n−1, n−2). Thus as indicated in the figures that follow, only phase is updated during the deadtime interval. The other feedback values are updated during a 20 msec sum interval in parallel with high-speed digital operations. This compromise, which is of negligible consequence in performance and accuracy, relaxes timing constraints in the design of the feedback operations.

B. The C/A Channel

Figure 7A:
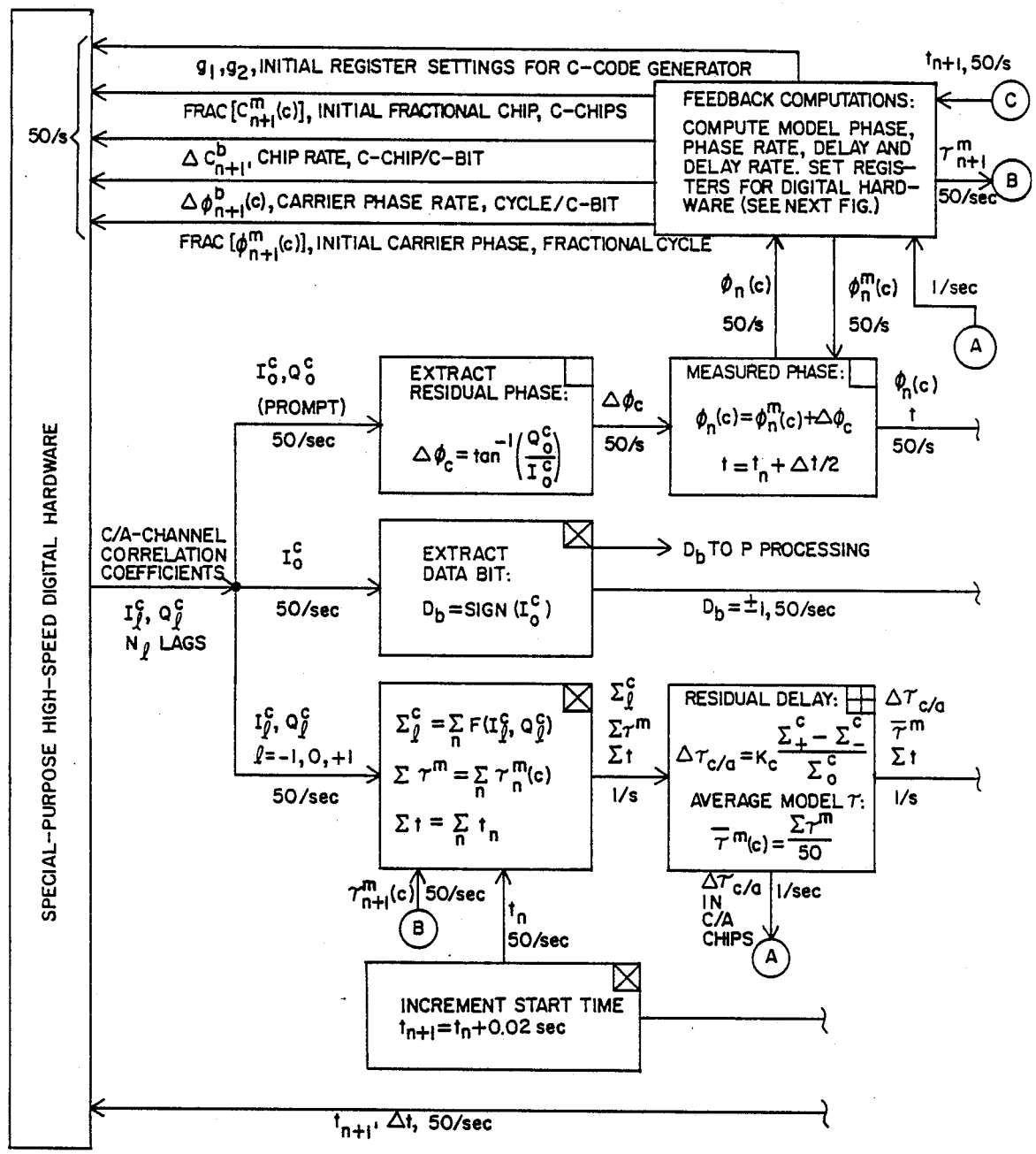
FIGS. 7a and 7b are flow charts of C/A channel signal processing in the tracking processor of the invention.
Figure 7B:
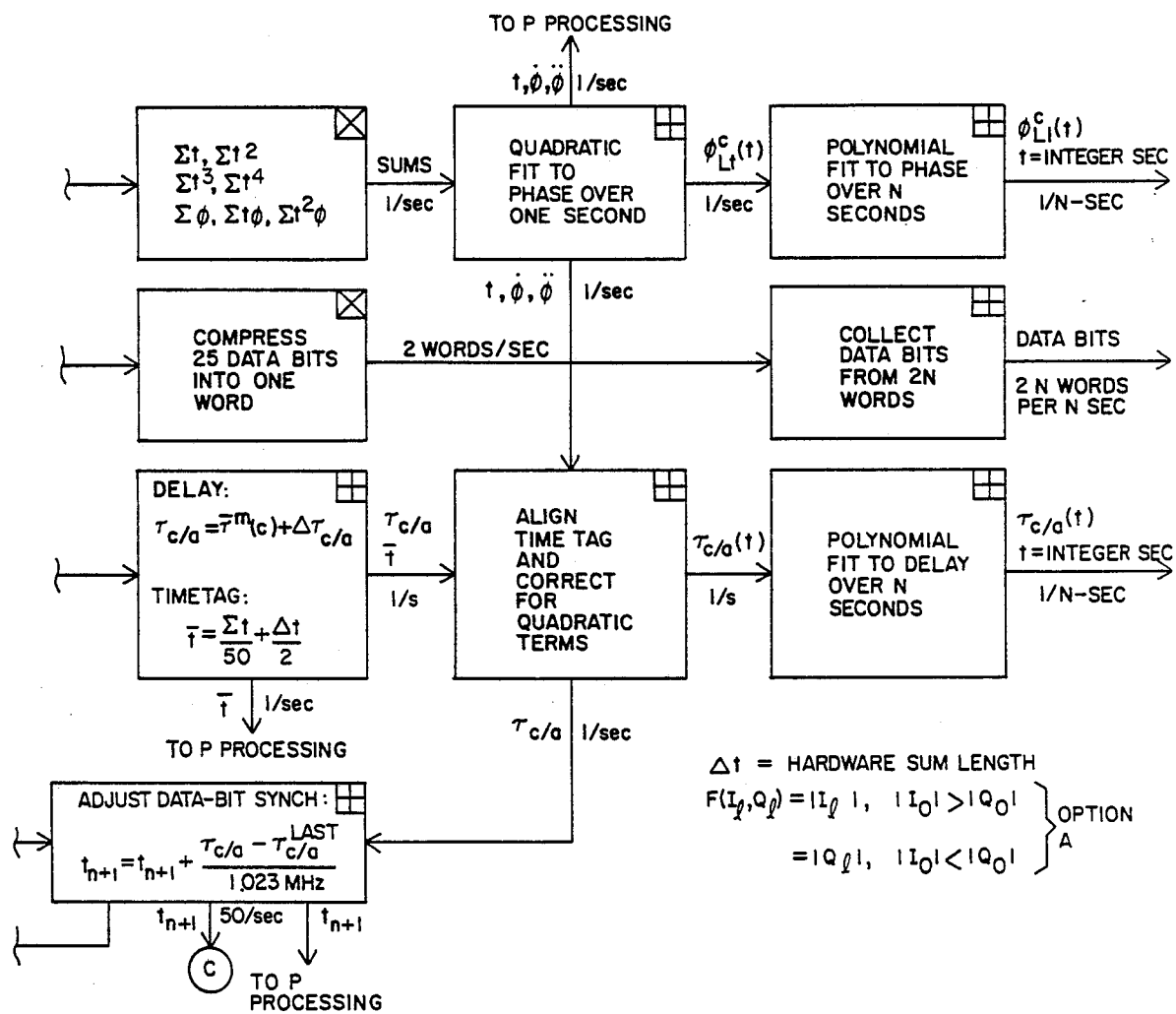
Figure 8B:
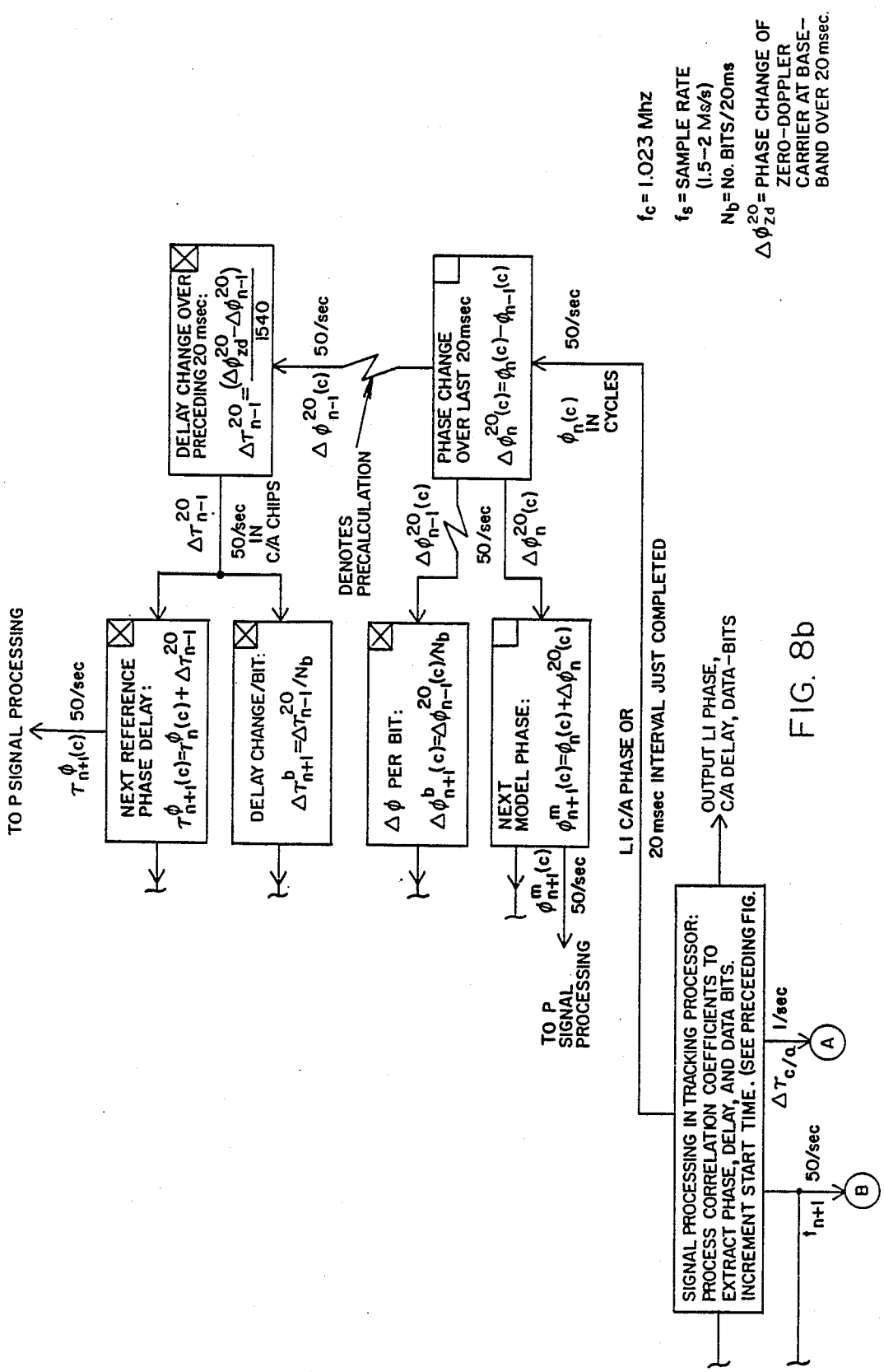

A block diagram of signal processing operations for the C/A channel is presented in FIGS. 7a and 7b, while the associated feedback operations are shown in FIGS. 8a and 8b. The signal processing operations will be explained first.

In each of FIGS. 7, 8 and 9, the function boxes representative of certain processing operations provide an indication of the timing nature of such operations. This indication is in the form of a small square in this upper right-hand corner of the function box. A blank square identifies operations that take place during the deadtime between 20 msec hardware sums. A square having an "x" identifies 20 msec operations taking place concurrently with hardware operations during a 20 msec sum. A square with a "+" identifies background multitasked "one second" operations.

(1) C/A SIGNAL PROCESSING

Every 20 milliseconds during the deadtime between 20 msec intervals, the tracking processor collects the correlation coefficients produced by the high-speed digital hardware and supplies new phase, chip, and start time information for the next 20 msec interval. The start time is precalculated during the preceding 20 msec interval by incrementing the start time variable by 20 milliseconds. In addition, once per second, an adjustment is made on the basis of measured delay in order to maintain data-bit synchronization. For ground-based receivers, data-bit synch can be maintained to better than 5 microseconds.

Processing follows three major routes: Carrier phase processing, data-bit extraction, and group delay processing. Along the phase route, the prompt in-phase and quadrature, components are combined during the deadtime between 20 msec intervals to extract residual phase. If feedback (model) phase is accurate to better than 0.25 cycle with respect to all errors (e.g. system noise, acceleration, oscillator instability), then a two-quadrant arctangent will yield a value for residual phase with the correct ½ cycle ambiguity. Also estimated during the deadtime is the total measured phase, which is equal to the residual phase plus the model phase previously supplied for that 20 msec interval. The time tag for this phase value is the 20 msec start time plus ½ of the "19 msec" sum interval.

This method for computing measured phase is unlike conventional phase lock loops, which take feedback phase as measured phase. By doing so, such loops ignore the most recent error signal (residual phase), which represents the offset of the most recent feedback phase relative to true phase. Therefore, in high dynamic applications where tracking errors are substantial, the conventional approach does not fully utilize this valuable information.

The resulting phase value is used to drive the feedback loop (to be described below). In addition, the 20 msec phase values are subjected to a quadratic fit over a one second interval with the reference time centered on an integer-second point. This fit provides values for phase, phase rate, phase rate rate once per second. The phase rate and phase rate rate are used to make corrections to the other observables as explained below.

The last step in processing phase is to compress data volume further, by fitting the one second values with a polynomial time function over N seconds, which leads to one output phase value each N seconds. The reference time (i.e. time tag) in each fit is placed on an integer second value that is an integer multiple of N seconds. If point positioning has been carried out to find the offset between receiver clock and GPS time, a time shift equal to that offset is applied in the fit so that the output timetag will refer to GPS time.

As shown in the second path of signal processing, the data-bit is extracted by testing the sign of the prompt inphase components of the C/A channel. (The extracted sign is actually the sign relative to the first data-bit. The overall sign for all data-bits is unknown at this point and must be determined in subsequent data-bit analysis). As data-bits are collected, they are compressed into words with 25 data-bits per 32-bit word. This leads to 2*N data-bit words per N-sec phase point in the output data set.

In the third path of C/A processing, group delay extraction, the correlation coefficients are summed over one second in order to reduce computation time and increase SNR. as indicated in FIG. 7a, early, late, and prompt amplitudes are summed using a compromise algorithm that is extremely simple computationally. If the magnitude of the in-phase component is larger than the magnitude of the quadrature components (which is typical), then the in-phase magnitude is summed. Otherwise the quadrature magnitude is summed. as the correlation coefficients are summed, the model delays and the start times are also summed.

Relative to the optimal processing in high dynamic cases, this compromise can cost as much as root$-2$ in voltage SNR in the sums, but is becomes the optimal approach, a coherent sum of the in-phase component, for low dynamic cases (e.g. <2 g's for 20 msec feedback). A coherent sum is particularly desirable in low SNR tracking. The root$-2$ loss in high dynamic cases does not weaken tracking lock since lock depends on C/A phase, but precision of measured delay is reduced by root$-2$. Simplicity of the algorithm, its optimality under low dynamics and its respectable performance under high dynamics make the algorithm an attractive choice for the one second averages. Another option is to perform a noncoherent sum of the RSS of the in-phase and quadrature components. This option is more complicated computationally, is suboptimal for low-SNR, low-dynamic cases but is better for high dynamic cases with adequate SNR.

Once per second, the sums are analyzed to calculate residual delay and average model delay by means of the formulas in FIG. 7a. The resulting residual delay is sent to the feedback portion of the code as a slow delay feedback. Residual delay is also combined with average model delay to obtain total measured C/A group delay. The timetag for this delay is the average start time plus $\frac{1}{2}$ of the "19 msec" sum interval. This delay observable now requires two corrections. Based on the phase rate from the one second fit to C/A phase, the first correction shifts the timetag from the average timetag to the integer-second timetag t. Based on the phase rate rate from the same fit, the second correction removes the bias in delay caused by the quadratic term (delay rate rate). By removing non-linear effects in this manner, one avoids fitting a separate quadratic to the delay values over one second. Not only does this approach simplify processing for group delay, but it results in a smaller system noise error in group delay (by a factor of about 1.5) by avoiding correlation between the solve-for parameters of $\tau_0$ and $\dot{\tau}$, in the quadratic fit.

Another option exists for removing time variations of group delay over each "one second" interval, an option that is more exact but requires more operations at the 20 Msec level. First, the total C/A carrier phase measured for a given 20 msec interval is converted to phase delay by removing the L.O. offset term. For each 20 msec interval, the resulting phase delay is subtracted from the model (feedback) value for C/A, $P_1$, and $P_2$ group delays. The resulting differences, which are essentially time independent, are then subjected to a straight average over the "one second" interval. Meanwhile, the same 20 msec values for C/A phase delay are subjected to a quadratic fit over the "one second" interval with the reference time centered on the integer second. The estimated phase emerging from this fit represents C/A phase delay at the reference time. Total measured group delay for each of the three channels is then obtained by adding this estimated phase, the "one second" residual phase and the aforementioned averaged difference that pertains to the given channel. The timetag for these observables is the reference time mentioned above. Since this approach also avoids solving for $\dot{\tau}$ using the delay observables, it also avoids the correlation between $\tau$ and $\dot{\tau}$ and provides a system noise error in delay that is 1.5 times better that that provided by the separate quadratic fit to each type of delay observable.

The last step in processing delay is to compress data volume further by fitting the one second values with a polynomial time function over N seconds, which leads to one output delay value each N seconds. The reference time (i.e. timetag) and fit interval in each fit conform with the C/A phase fit described above.

(2) THE C/A FEEDBACK LOOP

As illustrated in FIGS. 8a and 8b, the feedback loop for the C/A channel consists of the following steps: During the deadtime between 20 msec intervals, carrier phase measured for the $(n-1)$'th 20 msec interval (the last interval completed) is subtracted from the measured phase for the interval just completed, the n'th interval, to obtain an estimate for the most recent phase change per 20 milliseconds. To predict phase for the center of the next 20 msec interval, the $(n+1)$'th interval, this phase change is added to the center phase of the n'th interval. Another correction, not shown in FIGS. 8a and 8b, is applied to this extrapolated center phase value to shift it by $\frac{1}{2}$ interval to the start of the $(n+1)$'th interval. To set the phase register for the digital hardware, the fractional part of the extrapolated start phase is extracted and multiplied by $2^{24}$.

Numerous other algorithms for projecting phase can be devised. For example, instead of intervals $(n, n-1)$, phase change could be estimated from one of the following pairs: $(n, n-2)$k, $(n-1, n-2)$, $(n-1, n-3)$. These combinations would work better for low SNR, but could not handle as high an acceleration. Another extrapolation option is to implement a conventional second order phase lock loop in which residual phases are used in a calculation of the next phase rate, and feedback phase is made a continuous piecewise linear function.

The 20 msec phase change estimated above is also used to generate the phase rate register for the digital hardware, except that the previous phase change, the $(n-1)$'th, is used rather than the n'th. This approximation allows operations to be performed concurrently with digital hardware operations rather than during the deadtime between 20 msec intervals. Phase change per bit is calculated by dividing the 20 msec quantity by the number of bits per 20 milliseconds. The integer value passed to the digital hardware is equal to the phase change per bit (in cycles per bit) times $2^{24}$.

The precalculated phase change is also used in delay and feedback chip estimation. First, the precalculated phase change is converted to phase delay change by removing the effect of the LO offset (i.e., 12320 Hz for $L_1$) and then dividing by the number (1540) of $L_1$ cycles per C/A chip. This approximate delay change is then used to determine for the next 20 msec interval both the model delay and the model delay change per bit. The delay change per bit is estimated by simply dividing by the number of bits per 20 milliseconds. To obtain the total chip change per bit, this delay change per bit is subtracted from the chip change per bit due to the passage of time (i.e. 1.023 MHz/c-sample rate). The result is then multiplied by $2^{24}$ to produce the integer value that the digital hardware expects for the chip rate.

To estimate phase delay at the center of the next 20 msec interval $(n+1)$, the delay change/20 msec calculated above is added to the phase delay for the present 20 msec interval (n). The C/A group delay for the next interval is then obtained by adding a slowly varying delay offset variable to the phase delay. Once each second (once per 50 feedbacks), this delay offset is subjected to a slow feedback adjustment in the form of the residual delay from C/A group delay processing. This adjustment corrects for the slow drift of group delay relative to phase delay (typically <2 cm/sec). Next, based on the precalculated start time of the next 20 msec interval, the model chip is set equal to the chip rate (1.023 MHz) times the start time minus the model group delay. Not shown in FIGS. 8a and 8b is an adjustment needed to shift the model chip from the center to the start of the 20 msec interval. This shift is equal to the chip rate estimated above times $\frac{1}{2}$ the "19 msec" sum interval. The resulting model chip is separated into integer and fractional parts. The fractional part is multiplied by $2^{24}$ to obtain the integer value sent to the digital hardware as the initial value in the chip advancer. The integer part is used to obtain (by table lookup) the g1 and g2 registers needed to initialize the first (integer) chip sign supplied by the digital hardware. Accurate data-bit synchronization in the start times keeps the table lookup range small and near the beginning of the full 0–1022 range of possible starting chips (calculated modulo 1023).

C. P CHANNEL PROCESSING

Figure 9A:
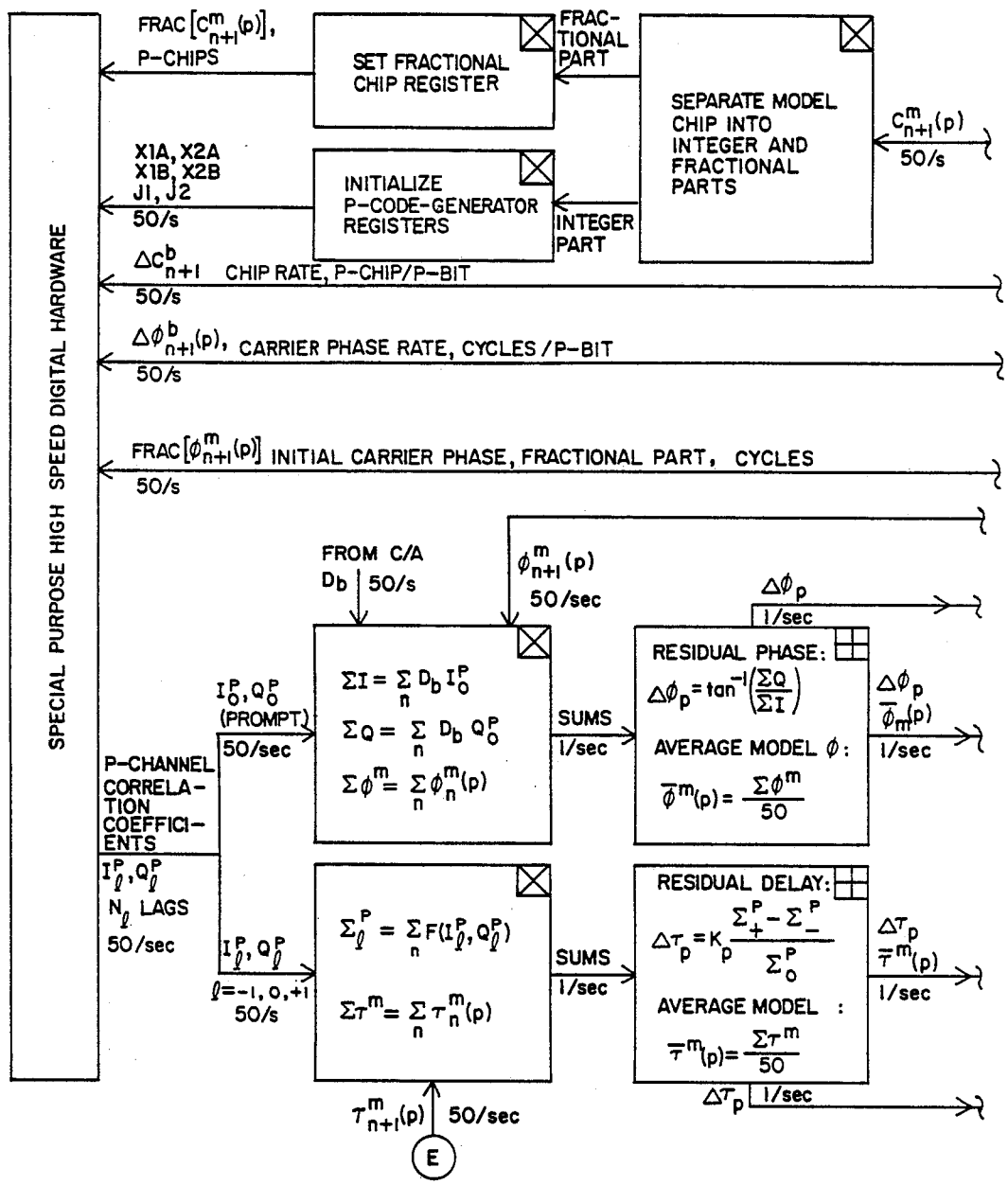
FIGS. 9a and 9b, are flow charts of the P channel signal processing in the tracking processor of the invention.
Figure 9B:
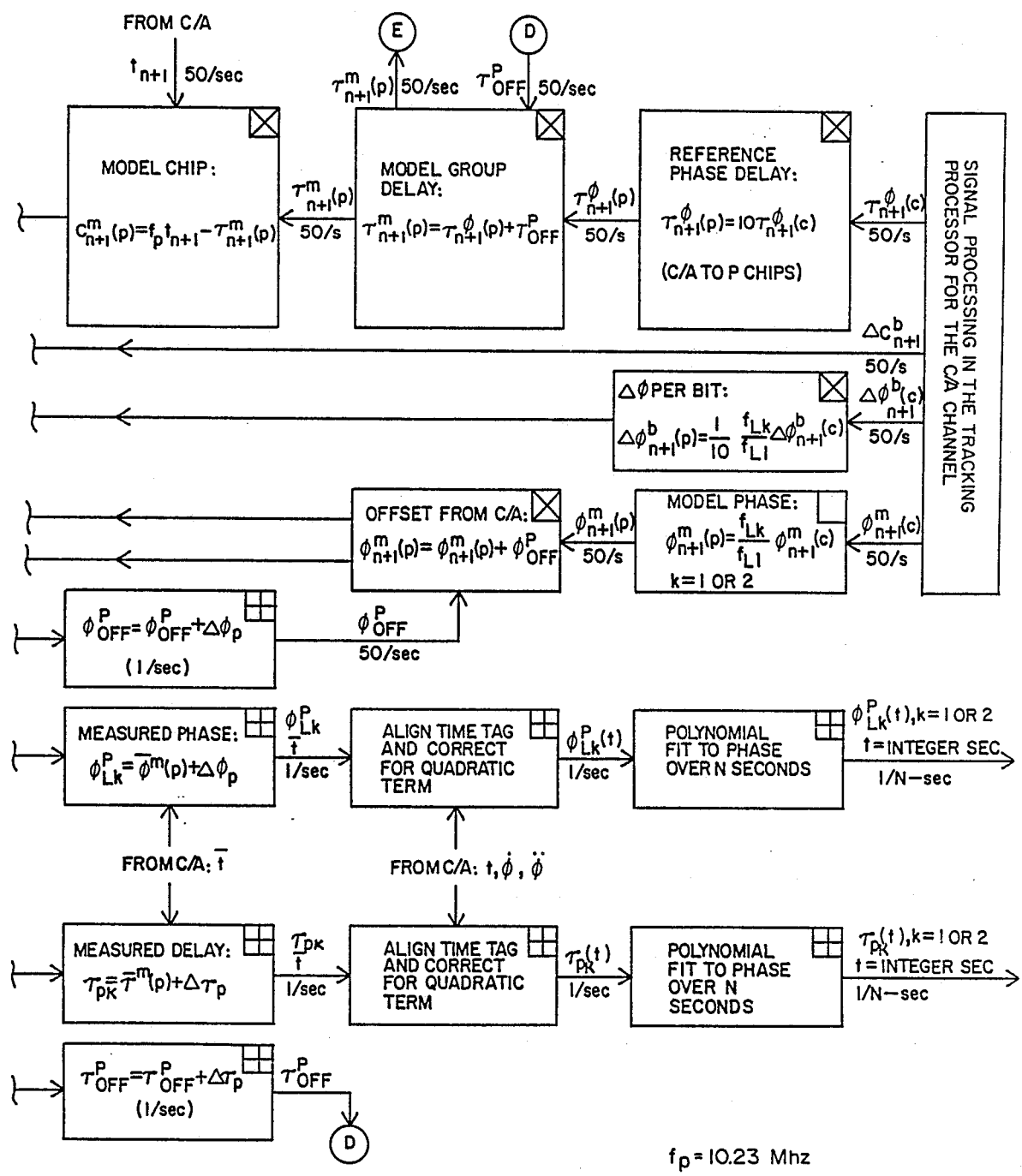

A block diagram summarizing post-correlation processing for a P channel (either $P_1$ or $P_2$) is shown in FIGS. 9a and 9b. Signal processing will be described first followed by feedback operations.

(1) P SIGNAL PROCESSING

After collecting the P channel correlation coefficients, the signal processing follows two paths: One path extracts phase while the other extracts delay. In both cases, the correlation coefficients are accumulated for one second to collect statistics and reduce the computational load. The long integration time is possible due to the accurate short-term feedback derived from C/A $L_1$ phase.

Along the phase route, the in-phase and quadrature components of the prompt lag are summed after a sign correction based on the data-bit sign extracted for the same 20 msec interval from the prompt lag of the C/A channel. Model phase is summed along with the correlation coefficients. Each second, the sums are collected and the sum registers are set equal to zero in preparation for the next one second sum. (In applications with high accelerations or extremely rapid ionosphere changes, it might be necessary to sum the P channels along the phase route for a period shorter than one second in order to make a more rapid correction to the fast feedback for phase. For example, a 200 msec sum would still average down system noise by a factor of three but would track phase with five times the "loop bandwidth" associated with the one second feedback).

Residual phase is extracted with an arctangent operation based on the in-phase and quadrature components. Due to the data-bit sign correction, a four-quadrant arctangent can be performed with $-\frac{1}{2}$ to $+\frac{1}{2}$ cycle range. Average model phase is computed as the straight average of the 50 model phases in the one second interval.

As shown in FIG. 9b, residual phase is added each second to a phase offset variable that keeps track of the offset and slow drift of P phase relative to C/A phase. (In cases of high acceleration it might be necessary to divide the slow feedback correction to P phase by 3.0 in order to damp oscillations caused by overcorrection of acceleration effects). Separate offsets are tracked for the $P_1$ and $P_2$ channels. The use of offset phase in feedback will be discussed below. Total measured phase is computed as the sum of residual phase and averaged model phase. The timetag for the phase observable is the average timetag computed in the C/A channel. To align this timetag with the integer-second timetag at the center of the one second interval, a correction based on the "one second" phase rate from the C/A $L_1$ channel must be applied. In addition, a correction based on the phase rate rate obtained from C/A $L_1$ is applied to remove the bias caused by the quadratic term. For $L_2$, both of these corrections must be scaled by RF frequency.

After these corrections, the phase values are fit with a polynomial over N seconds to produce one phase observable each N seconds. The fit interval length and timetag conform with the C/A $L_1$ observable.

Along the delay processing path, the correlation coefficients for the early, prompt, and late lags are accumulated over one second, as are the associated model delays. The algorithm for summing P amplitudes is the same as the one used for C/A. Each second, the one second sums are collected to compute the residual delay according to the formula in FIG. 9a. The resulting residual delay is added to a delay offset variable that keeps track of the offset and slow drift of P group delay relative to C/A phase delay. This delay offset is used in the feedback loop, as discussed below. Total measured group delay is computed as the sum of the residual delay and the average model delay. Two corrections are then applied to this delay in a manner analogous to the C/A delay, except that the phase to delay conversion number is 154 rather than 1540. As it did for C/A delay, this approach reduces system noise error in P group delay by a factor of about 1.5. After these corrections, P delay is fit over N seconds in the same manner as the other observables.

(2) P FEEDBACK OPERATIONS

In the P feedback loop, the first step is to estimate fast feedback phase at the center of the next interval, the $(n+1)$'th, by first scaling the C/A feedback phase by RF frequency and then adding the offset phase that accounts for offset and slow drift of P phase relative to C/A $L_1$ phase. These operations are, in effect, carried out during the deadtime interval between 20 msec intervals. Not shown in FIGS. 9a and 9b is a correction to shift the center phase to start-time phase, as with C/A phase. The fractional-cycle part of the resulting phase is then multiplied by $2^{24}$ to obtain the integer value needed to initialize the phase advancer of the digital hardware.

Phase rate feedback for P is obtained by scaling the C/A phase change per bit according to RF frequency and then scaling according to bit size. The resulting phase rate is then multiplied by $2^{24}$ to obtain the integer value needed to initialize the phase rate register in the phase advancer in the digital hardware.

Estimation of P chip rate feedback is very simple since the C/A chip rate is the same as the P chip rate (i.e. P-chip/P-bit=C-chip/C-bit). To obtain the integer value needed to set the rate portion of the P chip advancer in the digital hardware, however, the chip rate is multiplied by $2^{28}$ rather than $2^{24}$.

Estimation of the model chip feedback is preceded by the estimation of model group delay for P at the center of the next, the $(n+1)$'th, 20 msec interval. That model group delay is computed by multiplying the C/A phase delay for the $(n+1)$'th interval by 10 to account for chip size and then adding the aforementioned delay offset ($P_1$ or $P_2$) that accounts for the offset of P group delay from C/A phase delay. Model chip feedback, the projected chip value at the start of the $(n+1)$'th interval is computed by multiplying the P chip rate by the start time and subtracting the model group delay. Not shown in FIGS. 9a and 9b is a correction based on total chip rate that shifts from the center of the interval to the start time. The resulting chip value is separated into integer and fractional parts. From the integer part are derived seven register values that initialize the P code generator so that it will produce the correct initial chip sign. The fractional-chip part is multiplied by $2^{28}$ to obtain the integer value that sets the fractional-chip portion of the chip advancer in the digital hardware.

(3) OTHER EMBODIMENTS

A number of variations of the above processing scheme can be devised. In some applications, it may be desirable to drop the C/A channel after acquisition and base fast feedback for delay and phase for the $P_1$ and $P_2$ channels on $P_1$ carrier phase. Block diagrams for this implementation would be identical to those presented above except for several minor changes in scaling and variables. First, all C/A identifiers would be replaced by "$P_1$" in FIGS. 7, 8 and 9. Scaling changes include the following: 1540 becomes 154 in FIG. 8b, the two X10 conversion factors for phase delay and delay rate in FIG. 9b would be eliminated, and $F_s$ would be ten times larger. In FIG. 9b, only K=2 would be employed. In FIG. 8a, 6 numbers would be passed to initialize the code generator for $P_1$.

Another variation is to have each channel operate independently, with a separate fast feedback for carrier phase for each channel and with the fast feedback for delay for each channel based on carrier phase for that channel. The block diagram for this option would be equivalent to FIGS. 7 and 8, with channel identifiers set to C/A, $P_1$ or $P_2$, depending on the given channel. The scale factor 1540 would become 1540, 154 or 120 for C/A, $P_1$ and $P_2$, respectively. The sample rate $f_s$ would be increased by a factor of ten for the P channels. The delay used to offset the start time could be the group delay from any one of the channels. Again, for the P channel, the feedback would supply 6 numbers to initialize the code generator register.

D. ADVANTAGES

The digital tracking processor described above possesses many features that distinguish it from other tracking approaches. Besides the obvious advantages of compactness, reliability and accuracy provided by the all-digital aspect of the processor, there are numerous other advantages provided by the following distinctive design features.

The most distinctive feature of the tracking processor is the feedback approach: C/A phase drives all fast feedback loops. Several important advantages are gained by this approach. the C/A channel is the strongest channel (see PRIOR ART discussion) so that the P channels will lose lock at much lower SNR than for separate P feedback loops. Because of the one second integration time for the P channels, those channels are strengthened by a factor of 50 in power SNR relative to the standard 20 msec integration time, which is more than the difference in power between C/A and $P_2$, even if C/A is quadrature and $P_2$ is not. Thus, as signal strength decreases, loss of lock for the $P_2$ channel will be determined by C/A lock, which provides a 6 db improvement (for nominal phase I power levels) over the common approach using separate 20 msec feedback loops for all channels.

Another benefit of this approach is that system-noise errors in feedback for P carrier phases and for C/A and P group delays are reduced. For all feedback delays, the system noise error is reduced by a factor of 7 relative to 20 msec delay-locked loops since the slow delay feedback is averaged over one second and since the C/A phase projection introduces virtually no system noise error in delay. Besides providing much more stable loops, this greatly reduces delay feedback error which, in turn, greatly reduces the error due to nonlinearity in or miscalibration of loop response. With this approach, loop response errors can be reduced to less than 0.1 millichip (0.3 cm for P).

System noise error in P feedback phase is reduced by a factor approximately equal to the ratio of system-noise error in C/A phase to system-noise error in P phase. (The error contributed by P system noise via the slow feedback loop is relatively small due to the one second average). For $P_2$, this ratio is ½ based on power specifications for GPS phase I. Another root−2 relative improvement is realized if C/A is quadrature and P is not. Smaller system-noise feedback errors in feedback phase reduce the probability of cycle slips and make it possible to add more coherently the P correlation coefficients over a one second interval.

Another benefit of C/A-based feedback is that, for some applications, quadrature implementation would not be needed for the P channels. With C/A feedback, signal lock for the P channels would not be improved by adding the P-quadrature component even though the final output P-phase and P-delay precision would be improved by root−2. Applications that demand good lock but that do not require ultimate precision would implement quadrature only on C/A. Avoidance of quadrature implementation on the P channels would substantially reduce the complexity and cost of both frontend and baseband hardware.

Tests and theory indicate that high accelerations can be reliably tracked by this feedback technique. For the C/A channel, accelerations as high as 10, 30 and 100 g's can be tracked with feedback intervals of 20, 10 and 5 msec, respectively.

Data-bit extraction consists of a simple sign check on the C/A prompt in-phase components. The data-bit circuitry found in some other receiver designs is avoided.

The data-bit sign extracted from the C/A channel is used to remove the data-bit sign from both of the P channels. Provided the C/A sign is correct, this correction procedure expands the phase ambiguity range for the P channels from 180 to 360 degrees, thereby greatly reducing the possibility of cycle slips for those channels. Given the higher SNR of the C/A channel, this procedure is much more reliable than removal of the P-channel sign on the basis of the P-channel alone.

The simple and reliable computational method used to enforce data-bit synchronization aligns the 20 msec sum with the data-bit edges with accuracies better than 5 microseconds for ground-based receivers. The more complicated circuitry and software used for data-bit synchronization in other receivers are avoided.

The simple technique used for cycle counting has proven to be extremely reliable. Carrier cycle counting is implicitly carried out when phase is accurately projected ahead to the next interval. That is, model phase "keeps track" of the integer cycles while residual phase (i.e. the feedback error after its measurement) provides the small fractional cycles correction. This approach for cycle counting avoids the special cycle count circuitry found in some receiver designs. For this process to work, projected phase for the C/A channel must be in error by no more than 90 degrees, which is a condition readily met for wide ranges of SNR and dynamics. For the P channels, projected phase must be in error by no more than 180 degrees. As in other respects, cycle counting for the P channels depends on the solid performance of the C/A channel, since the C/A cycle count is scaled to the other channels. Deviations between $L_1$ phase and $L_2$ phase caused by the ionosphere are typically a very small fraction of a cycle over one second and are therefore easily tracked by the slow feedback loop without causing cycle slips.

Valuable flexibility is provided by allowing a choice (1, 2, 4, 5, 10 or 20 msec) of fast feedback intervals. Based on dynamics/SNR tradeoffs, the user can select the optimal feedback interval.

By providing a wide choice (1, 2, 3, ... 300 sec) of time separations for output data points, the tracking processor can satisfy a wide range of users. Subsequent data reduction is simplified for the user by providing timetags on integer seconds accurately synchronized to GPS time.

If necessary, C/A phase data could be output at an even faster rate, say every fast feedback interval (e.g. every 20 msec). By shortening the sum interval for the slow feedback, the other observables could be output much more frequently, for example, every 200 msec.

CHIP ADVANCER

By supplying the proper initial integer chip to initialize the code generator, fractional chip and chip rate for the chip advancer, the external hardware or software can control a code sequence that starts at a fraction of a given chip and advances at the selected chip rate. In a GPS receiver, the initial chip value (integer plus fractional parts) would be based on start time and feedback delay, while chip rate would be equal to the sum of the delay rate and the fundamental chip rate divided by the sample rate. The chip advancer is activated and deactivated by a "start" line. Over a correlation interval, the model delay consists of a linear time function.

Figure 10:
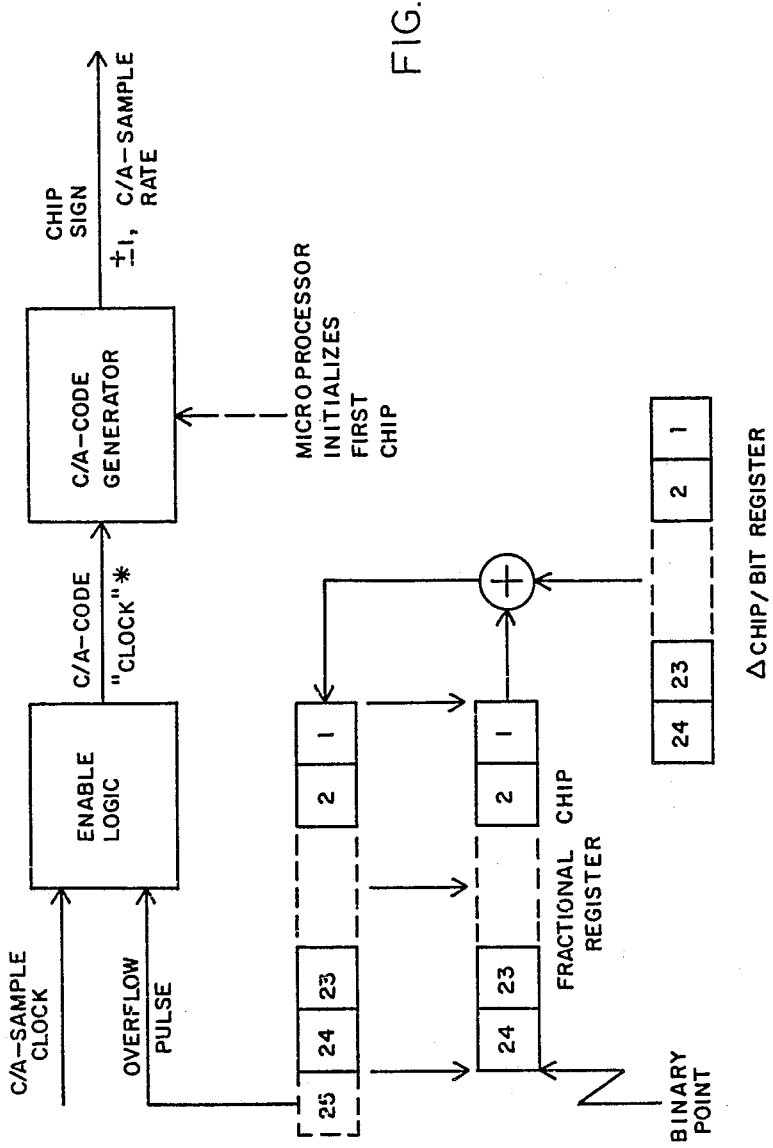
FIG. 10 is a block diagram of a chip advancer used in the present invention for generating a pseudorandom code sequence.

As illustrated in FIG. 10 for a C/A code generator, the chip advancer is initialized by external hardware or software that supplies an initial fractional chip value in the form of an integer equal to fractional chip times $2^N$ and a chip rate in the form of a integer equal to chip rate (in chips/bit) times $2^N$, where N is the number of bits in the fractional chip register. Simultaneously, the external device also initializes the code generator registers so that is will produce the correct code sign for the first sample point. When processing is started, the chip advancer is closed by the sampling clock (e.g., C/A-sample clock). For each new sample point, the chip advancer adds the rate register to the fractional chip register. When the fractional chip register overflows indicating a transition to a new chip, a pulse is sent to advance the code generator to a new chip. That pulse triggers enable logic that lets the concurrent sampling clock edge advance the code generator to the next chip. If the code generator does not receive a new-chip advance for a given sample point, the previous code sign persists for that sample. If the sample rate is selected so that it is highly incommensurate with the fundamental chip rate, the integrated error due to discrete sampling of the model code sequence can be reduced to negligible levels after integration over a fairly short time interval. For example, for a P sample rate of 15.374 MHz, the commensurability ratio becomes:

$$15374000/10230000 = 7687/5115$$

when the common factors are cancelled. One can readily show that, after 7687 samples (0.5 msec), the placement of a sample point relative to nearest chip edges begins to repeat so that the integrated error due to discrete sampling becomes 1/7687 after 0.5 milliseconds. In other words, if a chip sequence were shifted in time while the time positions of the sample points remained fixed, an entire sequence of 7687 sample point signs would not change until the magnitude of the shift reached 1/7687 chip. In this case, delay could not be measured any more accurately than 1/7687 chip (0.4 cm for a P chip). This error is actually the worst case-error incurred in the case of zero doppler. In practice, even this small error will be made much smaller by the smearing caused by changing doppler. For example, given the typical RF doppler rate of 0.7 Hz/sec for ground-based GPS receivers, the quantization error of 1/7687 will be traversed in only 0.24 seconds due to continuous chip shifting caused by changing doppler. Doppler smearing of this magnitude will reduce the quantization error by more than a factor of ten for a one second integration interval. In selecting a sample rate, it is advisable to choose a value that is sufficiently removed from highly commensurate ratios (e.g., 2/1, 3/2, etc.) so that doppler can not change the chip rate to a value highly commensurate with the sample rate.

An important advantage of the chip advancer is that starting chip value, including fractional chip, can be exactly set every sum interval. Thus, measured delay will be corrupted by roundoff errors at the level of $2^{-N}$ or less, which is less than 100 nanochips for a 24-bit chip advancer. Buildup of roundoff error due to roundoff in the rate register can be eliminated by computing the total roundoff accumulation, and offsetting the initial delay to compensate. Further, the flexibility of accurately resetting chip and chip rate for each correlation interval is very useful in many applications, for example, those involving multiplexing schemes. The flexibility in start time and sum interval is very useful in aligning correlation interval with data-bit boundaries.

It will now be understood that what has been disclosed herein comprises a unique digital signal processor and signal processing method for GPS receivers employing a digital carrier down-converter and code correlator, a digital tracking processor and a digital chip advancer. The digital carrier down-converter and code correlator provides an all-digital, minimum bit implementation that utilizes digital chip and phase advancers providing exceptional control and accuracy in phase and in feedback. Roundoff and commensurability errors are reduced to extremely small values (i.e., 100 nanochips and 100 nanocycles roundoff errors and 0.13 millichip and 1 millicycle commensurability errors). Minimum bit design reduces the number of logic elements thereby reducing cost, size and power consumption of electronics. The digital tracking processor bases all fast carrier phase and group delay feedback on the $L_1$ C/A carrier phase thereby maintaining lock at lower signal-to-noise ratios, reducing errors in feedback phase delay and in some cases obviating quadrature signal processing implementation on the P channels. The chip advancer is a digital pseudorandom code sequence generator in which chip and chip rate are reset each code correlation interval thereby improving feedback control and delay measurement accuracy. The invention combines the features of all-digital implementation with C/A phase-driven fast feedback loops for all phases and delays to provide high accuracy, high dynamics, loss of lock at lower signal strengths and infrequency carrier cycle slips. Simple techniques for data-bit extraction, data-bit synchronization and cycle counting eliminate the need for involved circuitry and/or software found in existing receivers. Flexibility is provided in selecting feedback interval and output averaging interval.

Those having skill in the relevant arts, will now as a result of the applicant's teaching herein, perceive various modifications and additions which may be made to the invention. By way of example, the C/A phase-lock-loop of the present invention could be switched to a conventional narrow-band phase-lock-loop in the case of low SNR to allow tracking of received signals with lower signal-to-noise ratios. Furthermore, implementation of quadrature signal processing may be carried out in similar parallel implementations with certain common functions integrated. Furthermore, instead of basing all fast feedback on C/A $L_1$ carrier phase, the C/A channel could be dropped after acquisition and all fast feedback could be based on P-$L_1$ carrier phase. Data-bit synchronization could be based upon the most recent value for $P_1$ group delay and removal of the $P_2$ data-bit sign would be based on the data-bit sign obtained from the $P_1$ channel. This approach of basing control on the $P_1$ carrier phase would be preferable in military applications but would lose lock at a signal level 3-dB worse than for the C/A-driven approach but 3-dB better than for separate phase-lock loops for $P_1$ and $P_2$ given nominal GPS power specifications. Furthermore, the preferred embodiment of the defined GPS system is characterized by certain implementation parameters disclosed herein; however the advantageous features of the invention may be derived in other signal processing applications using different parameters. Accordingly, all such modifications and additions are deemed to be within the scope of the invention which is to be limited only by the claims appended hereto.

I claim:

1. A digital signal processor for use in a Global Positioning System (GPS) receiver, the receiver of the type receiving a code-modulated signal, providing a digitized signal from said code-modulated signal, generating model delays, generating a model code sequence that is time offset by the model delays so that the resulting model code values are closely aligned in time with the received code sequence, and generating model carrier phases that are closely matched to received carrier phase, for accurately measuring the code group delay and carrier phase of the code-modulated signal; the processor comprising:

means for generating counter-rotation sinusoids from model phases;

means for counter-rotating the carrier phase of the digitized signal with said counter-rotation sinusoids;

means for multiplying the counter-rotated signal with the model code values and accumulating the multiplication produces over respective selected time intervals;

means for processing the accumulated products to obtain model phase and model delay; and means for modifying model carrier phase to obtain fast feedback models for code group delays.

2. The digital signal processor recited in claim 1 further comprising:

means for applying slow feedback corrections to the fast feedback models, for code group delay, by using accumulated products at selected intervals.

3. A digital signal processor for use in a Global Positioning System (GPS) receiver, the receiver of the type receiving at least two code-modulated signals, providing digitized signals from said code-modulated signals, generating model delays, generating model code sequences that are time offset by the model delays so that the resulting model code values are closely aligned in time with the received code sequences, and generating model carrier phases that are closely matched to received carrier phases, for accurately measuring the code group delay and carrier phase of each code-modulated signal; the processor comprising:

means for generating counter-rotation sinusoids from model phases;

means for counter-rotating the carrier phases of the digitized signals with said counter-rotation sinusoids;

means for multiplying the counter-rotated signals with the model code values and accumulating the multiplication products over respective selected time intervals;

means for processing the accumulated products to obtain model phases and model delays; and means for modifying model carrier phase to obtain fast feedback models for code group delays.

4. The digital signal processor recited in claim 3 further comprising:

means for applying slow feedback corrections to the fast feedback models, for code group delays, by using accumulated products at selected intervals.

5. A digital signal processor for use in a Global Positioning System (GPS) receiver, the receiver of the type receiving at least two code-modulated signals, providing digitized signals from said code-modulated signals, generating model delays, generating model code sequences that are time offset by the model delays so that the resulting model code values are closely aligned in time with the received code sequences, and generating model carrier phases that are closely matched to received carrier phases, for accurately measuring the code group delay and carrier phase of each code-modulated signal; the processor comprising:

means for generating counter-rotation sinusoids from model phases;

means for counter-rotating the carrier phases of the digitized signals with said counter-rotation sinusoids;

means for multiplying the counter-rotated signals with the model code values and accumulating the multiplication products over respective selected time intervals;

means for processing the accumulated products to obtain model phases and model delays; and means for modifying the model carrier phase of one of said code-modulated signals to obtain a fast feedback model for the carrier phase of another such code-modulated signal.

6. A digital signal processor for use in a Global Positioning System (GPS) receiver, the receiver of the type receiving a code-modulated signal, providing a digitized signal from said code-modulated signal, generating model delays, generating a model code sequence that is time offset by the model delays so that the resulting model code values are closely aligned in time with the received code sequence, and generating model carrier phases that are closely matched to received carrier phase, for accurately measuring the code group delay and carrier phase of the code-modulated signal; the processor comprising:

means for generating counter-rotation sinusoids from model phases;

means for counter-rotating the carrier phase of the digitized signal with said counter-rotation sinusoids;

means for multiplying the counter-rotated signal with the model code values and accumulating the multiplication products over respective selected time intervals;

means for processing the accumulated products to obtain model phase and model delay; and means for averaging measured code group delays over a selected short averaging interval by using concurrently measured values for carrier phase to remove the averaged effects of time variations of the code group delays over said interval.

7. A digital signal processor for use in a Global Positioning System (GPS) receiver, the receiver of the type receiving at least two code-modulated signals, providing digitized signals from said code-modulated signals, generating model delays, generating model code sequences that are time offset by the model delays so that the resulting model code values are closely aligned in time with the received code sequences, and generating model carrier phases that are closely matched to received carrier phases, for accurately measuring the code group delay and carrier phase of each code-modulated signal; the processor comprising:

means for generating counter-rotation sinusoids from model phases;

means for counter-rotating the carrier phases of the digitized signals with said counter-rotation sinusoids;

means for multiplying the counter-rotated signals with the model code values and accumulating the multiplication products over respective selected time intervals;

means for processing the accumulated products to obtain model phases and model delays; and means for averaging measured code group delays over a selected short averaging interval and using concurrently measured values for carrier phase to remove the averaged effects of time variations of the code group delays over said interval.

8. A digital signal processor for use in a Global Positioning System (GPS) receiver, the receiver of the type receiving a code-modulated signal, providing a digitized signal from said code-modulated signal, generating model delays, generating a model code sequence that is time offset by the model delays so that the resulting model code values are closely aligned in time with the received code sequence, and generating model carrier phase that are closely matched to received carrier phase, for accurately measuring the code group delay and carrier phase of the code-modulated signal; the processor comprising:

means for generating counter-rotation sinusoids from model phases;

means for counter-rotating the carrier phase of the digitized signal with said counter-rotation sinusoids;

means for multiplying the counter-rotated signal with the model code values and accumulating the multiplication products over respective selected time intervals;

means for processing the accumulated products to obtain model phase and model delay; and means for extracting measured carrier phase for a code-modulated signal by extracting residual phase from the accumulated products and then adding said residual phase to the model phase for the interval.

9. A digital signal processor for use in a Global Positioning system (GPS) receiver, the receiver of the type receiving a code-modulated signal, providing a digitized signal from said code-modulated signal, generating model delays, generating a model code sequence that is time offset by the model delays so that the resulting model code values are closely aligned in time with the received code sequence, and generating model carrier phases that are closely matched to received carrier phase, for accurately measuring the code group delay and carrier phase of the code-modulated signal; the processor comprising:

means for generating counter-rotation sinusoids from model phases;

means for counter-rotating the carrier phase of the digitized signal with said counter-rotation sinusoids;

means for multiplying the counter-rotated signal with the model code values and accumulating the multiplication products over respective selected time intervals;

means for processing the accumulated products to obtain model phase and model delay; and means for extracting measured code group delay for a code-modulated signal by extracting residual delay from the accumulated products and then adding said residual delay to the model delay for the interval.

10. A digital signal processor for use in a Global Positioning System (GPS) receiver, the receiver of the type receiving at least two code-modulated signals, providing digitized signals from said code-modulated signals, generating model delays, generating model code sequences that are time offset by the model delays so that the resulting mode code values are closely aligned in time with the received code sequence, and generating model carrier phases that are closely matched to received carrier phase, for accurately measuring the code group delay and carrier phase of each code-modulated signal; the processor comprising:

means for generating counter-rotation sinusoids from model phases;

means for counter-rotating the carrier phase of the digitized signals with said counter-rotation sinusoids;

means for multiplying the counter-rotated signals with the model code values and accumulating the multiplication products over respective selected time intervals;

means for processing the accumulated products to obtain model phases and model delays;

said receiver also receiving a data signal superimposed upon said code-modulated signals, said processor further comprising means for testing the logic sign of the accumulated products for extracting a data bit sign therefrom for a data-bit interval; and means for removing the data-bit signal from one code-modulated signal based upon the data-bit sign extracted from another code-modulated signal.

11. A digital signal processor for use in a Global Positioning System (GPS) receiver, the receiver of the type receiving a code-modulated signal, providing a digitized signal from said code-modulated signal, generating model delays, generating a model code sequence that is time offset by the model delays so that the resulting model code values are closely aligned in time with the received code sequence, and generating model carrier phases that are closely matched to received carrier phase, for accurately measuring the code group delay and carrier phase of each code-modulated signal; the processor comprising:

means for generating counter-rotation sinusoids from model phases;

means for counter-rotating the carrier phase of the digitized signal with said counter-rotation sinusoids;

means for multiplying the counter-rotated signal with the model code values and accumulating the multiplication products over respective selected time intervals;

means for processing the accumulated products to obtain model phase and model delay;

said receiver also receiving a data signal having defined data-bit intervals and being superimposed upon said code-modulated signal; and said digital processor further comprising means for synchronizing the product accumulation intervals with the data-bit intervals by offsetting accumulation interval start time with a previously measured code group delay.

12. A digital signal processor for use in a Global Positioning System (GPS) receiver, the receiver of the type receiving a code-modulated signal, providing a digitized signal from said code-modulated signal, generating model delays, generating a model code sequence that is time offset by the model delays so that the resulting model code values are closely aligned in time with the received code sequence, and generating model carrier phase that are closely matched to received carrier phase for accurately measuring the code group delay and carrier phase of each code-modulated signal; the processor comprising:

means for generating counter-rotation sinusoids from model phases;

means for counter-rotating the carrier phase of the digitized signal with said counter-rotation sinusoids;

means for multiplying the counter-rotated signal with the model code values and accumulating the multiplication products over respective selected time intervals;

means for processing the accumulated products to obtain model phase and model delay; and means for estimating model carrier phase over a future time interval by two-point linear extrapolation of measured phase from prior time intervals.

13. A digital signal processor for use in a Global Positioning System (GPS) receiver, the receiver of the type receiving at least two code-modulated signals, providing digitized signals from said code-modulated signals, generating model delays, generating model code sequences that are time offset by t he model delays so that the resulting mode code values are closely aligned in time with the received code sequences, and generating model carrier phases that are closely matched to received carrier phases, for accurately measuring the code group delay and carrier phase of each code-modulated signal; the processor comprising:

means for generating counter-rotation sinusoids from model phases;

means for counter-rotating the carrier phases of the digitized signals with said counter-rotation sinusoids;

means for multiplying the counter-rotated signals with the model code values and accumulating the multiplication products over respective selected time intervals;

means for processing the accumulated products to obtain model phases and model delays; and means for averaging measured carrier phase values of one code-modulated signal over a selected short averaging interval by using concurrently measured values of carrier phase of another code-modulated signal to remove the averaged effects of time variation in said one carrier phase over said interval.

14. A method of digitally processing signals in a Global Positioning System (GPS) receiver, the receiver of the type receiving a code-modulated signal, providing a digitized signal from said code-modulated signal, generating model delays, generating a model code sequence that is time offset by the model delays so that the resulting model code values are closely aligned n time with the received code sequence, and generating model carrier phases that are closely matched to received carrier phase, for accurately measuring the code group delay and carrier phase of the code-modulated signal; the method comprising the steps of:

generating counter-rotation sinusoids from model phases;

counter-rotating the carrier phase of the digitized signals with said counter-rotation sinusoids;

multiplying the counter-rotated signals with the model code values and accumulating the multiplication products over respective selected time intervals;

processing the accumulated products to obtain model phase and model delay; and modifying model carrier phase to obtain fast feedback models for code groups delays.

15. The method of digitally processing signals recited in claim 14 further comprising the step of applying slow feedback corrections to the fast feedback models, for code group delay, by using accumulated products at selected intervals.

16. A method of digitally processing signals in a Global Positioning System (GPS) receiver, the receiver of the type receiving at least two code-modulated signals, providing digitized signals from said code-modulated signals, generating model delays, generating model code sequences that are time offset by the model delays so that the resulting model code values are closely aligned in time with the received code sequences, and generating model carrier phases that are closely matched to received carrier phases, for accurately measuring the code group delay and carrier phase of each code-modulated signal; the method comprising the steps of:

generating counter-rotation sinusoids from model phases;

counter-rotating the carrier phases of the digitized signals with said counter rotation sinusoids;

multiplying the counter rotated signals with the model code values and accumulating the multiplication products over respective time intervals;

processing the accumulated products to obtain model phases and model delays; and modifying model carrier phase to obtain fast feedback models for code group delays.

17. The method of digitally processing signals recited in claim 16 further comprising the step of applying slow feedback corrections to the fast feedback models, for code group delay, by using accumulated products at selected intervals.

18. A method of digitally processing signals in a Global Positioning System (GPS) receiver, the receiver of the type receiving at least two code-modulated signals, providing digitized signals from said code-modulated signals, generating model delays, generating model code sequences that are time offset by the model delays so that the resulting mode code values are closely aligned in time with the received code sequences, and generating model carrier phases that are closely matched to received carrier phases, for accurately measuring the code group delay and carrier phase of each code-modulated signal; the method comprising the steps of:

generating counter-rotation sinusoids from model phases;

counter-rotating the carrier phases of the digitized signals with said counter-rotation sinusoids;

multiplying the counter-rotated signals with the model code values and accumulating the multiplication products over respective time intervals;

processing the accumulated products to obtain model phases and model delays; and modifying the model carrier phase of one of said code-modulated signals to obtain a fast feedback model for the carrier phase of another such code-modulated signal.

19. A method of digitally processing signals in a Global Positioning system (GPS) receiver, the receiver of the type receiving a code-modulated signal, providing a digitized signal from said code-modulated signal, generating model delays, generating a model code sequence that is time offset by the model delays so that the resulting model code values are closely aligned in time with the received code sequence, and generating model carrier phases that are closely matched to received carrier phase, for accurately measuring the code group delay and carrier phase of the code-modulated signal; the method comprising the steps of:

generating counter-rotation sinusoids from model phases;

counter-rotating the carrier phase of the digitized signals with said counter-rotation sinusoids;

multiplying the counter-rotated signals with the model code values and accumulating the multiplication products over respective selected time intervals;

processing the accumulated products to obtain model phase and model delay; and averaging measured code group delays over a selected short averaging interval by using concurrently measured values for carrier phase to remove the averaged effects of time variations of the code group delays over said interval.

20. A method of digitally processing signals in a Global Positioning System (GPS) receiver, the receiver of the type receiving at least two code-modulated signals, providing digitized signals from said code-modulated signals, generated model delays, generating model code sequences that are time offset by the model delays so that the resulting model code values are closely aligned in time with the received code sequences, and generating model carrier phases that are closely matched to received carrier phases, for accurately measuring the code group delay and carrier phase of each code-modulated signal; the method comprising the steps of:

generating counter-rotation sinusoids from model phases;

counter-rotating the carrier phases of the digitized signals with said counter rotation sinusoids;

multiplying the counter rotated signals with the model code values and accumulating the multiplication products over respective time intervals;

processing the accumulated products to obtain model phases and model delays; and averaging measured code group delays over a selected short averaging interval and using concurrently measured values for carrier phase to remove the averaged effects of time variations of the code group delays over said interval.

21. A method of digitally processing signals in a Global Positioning System (GPS) receiver, the receiver of the type receiving a code-modulated signal, providing a digitized signal from said code-modulated signal, generating model delays, generating a model code sequence that is time offset by the model delays so that the resulting model code values are closely aligned in time with the received code sequence, and generating model carrier phases that are closely matched to received carrier phase, for accurately measuring the code group delay and carrier phase of the code-modulated signal; the method comprising the steps of:

generating counter-rotation sinusoids from model phases;

counter-rotating the carrier phase of the digitized signals with said counter-rotation sinusoids;

multiplying the counter-rotated signals with the model code values and accumulating the multiplication products over respective selected time intervals;

processing the accumulated products to obtain model phase and model delay; and extracting measured carrier phase for a code-modulated signal by extracting residual phase from the accumulated products and then adding said residual phase to the model phase for the interval.

22. A method of digitally processing signals in a Global Positioning System (GPS) receiver, the receiver of the type receiving a code-modulated signal, providing a digitized signal from said code-modulated signal, generating model delays, generating a model code sequence that is time offset by the model delays so that the resulting model code values are closely aligned in time with the received code sequence, and generating model carrier phases that are closely matched to received carrier phase, for accurately measuring the code group delay and carrier phase of the code-modulated signal; the method comprising the steps of:

generating counter-rotation sinusoids from model phases;

counter-rotating the carrier phase of the digitized signals with said counter-rotation sinusoids;

multiplying the counter-rotated signals with the model code values and accumulating the multiplication products over respective selected time intervals;

processing the accumulated products to obtain model phase and model delay; and extracting measured code group delay for a code-modulated signal by extracting residual delay from the accumulated products and then adding said residual delay to the model delay for the interval.

23. A method of digitally processing signals in a Global Positioning System (GPS) receiver, the receiver of the type receiving at least two code-modulated signals, providing digitized signals from said code-modulated signals, generating model delays, generating model code sequences that are time offset by the model delays so that the resulting model code values are closely aligned in time with the received code sequences, and generating model carrier phases that are closely matched to received carrier phases, for accurately measuring the code group delay and carrier phase of each code-modulated signal; the method comprising the steps of:

generating counter-rotation sinusoids from model phases;

counter-rotating the carrier phases of the digitized signals with said counter rotation sinusoids;

multiplying the counter rotated signals with the model code values and accumulating the multiplication products over respective time intervals;

processing the accumulated products to obtain model phases and model delays;

receiving a data signal superimposed upon said code-modulated signals, testing the logic sign of the accumulated products for extracting a data bit sign therefrom for a data bit interval; and removing the data bit sign from one code-modulated signal based upon the data bit sign extracted from another code-modulated signal.

24. A method of digitally processing signals in a Global Positioning System (GPS) receiver, the receiver of the type receiving a code-modulated signal, providing a digitized signal from said code-modulated signal, generating model delays, generating a model code sequence that is time offset by the model delays so that the resulting model code values are closely aligned in time with the received code sequence, and generating model carrier phases that are closely matched to received carrier phase, for accurately measuring the code group delay and carrier phase of the code-modulated signal; the method comprising the steps of:

generating counter-rotation sinusoids from model phases;

counter-rotating the carrier phase of the digitized signals with said counter-rotation sinusoids;

multiplying the counter-rotated signals with the model code values and accumulating the multiplication products over respective selected time intervals;

processing the accumulated products to obtain model phase and model delay;

receiving a data signal having defined data-bit intervals and being superimposed upon said code-modulated signal; and synchronizing the product accumulation intervals with the data-bit intervals by offsetting accumulation interval start time with a previously measured code group delay.

25. A method of digitally processing signals in a Global Positioning System (GPS) receiver, the receiver of the type receiving a code-modulated signal, providing a digitized signal from said code-modulated signal, generating model delays, generating a model code sequence that is time offset by the model delays so that the resulting model code values are closely aligned in time with the received code sequence, and generating model carrier phases that are closely matched to received carrier phase, for accurately measuring the code group delay and carrier phase of the code-modulated signal; the method comprising the steps of:

generating counter-rotation sinusoids from model phases;

counter-rotating the carrier phase of the digitized signals with said counter-rotation sinusoids;

multiplying the counter-rotated signals with the model code values and accumulating the multiplication products over respective selected time intervals;

processing the accumulated products to obtain model phase and model delay; and estimating model carrier phase over a future time interval by two-point linear extrapolation of measured phase from prior time intervals.

26. A method of digitally processing signals in a Global Positioning System (GPS) receiver, the receiver of the type receiving at least two code-modulated signals, providing digitized signals from said code-modulated signals, generating model delays, generating model code sequences that are time offset by the model delays so that the resulting model code values are closely aligned in time with the received code sequences, and generating model carrier phases that are closely matched to received carrier phases, for accurately measuring the code group delay and carrier phase of each code-modulated signal; the method comprising the steps of:

generating counter-rotation sinusoids from model phases;

counter-rotating the carrier phases of the digitized signals with said counter rotation sinusoids;

multiplying the counter rotated signals with the model code values and accumulating the multiplication products over respective time intervals;

processing the accumulated products to obtain model phases and model delays; and averaging measured carrier phase values of one codemodulated signal over a selected short averaging interval by using concurrently measured values of carrier phase of another code-modulated signal to remove the averaged effects of time variation in said one carrier phase over said interval.

* * * * *